(12) United States Patent
Kurasawa et al.

(10) Patent No.: US 10,496,223 B2
(45) Date of Patent: *Dec. 3, 2019

(54) TOUCH DETECTION DEVICE AND DISPLAY DEVICE WITH TOUCH DETECTION FUNCTION

(71) Applicant: Japan Display Inc., Tokyo (JP)

(72) Inventors: Hayato Kurasawa, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,027

(22) Filed: Nov. 21, 2018

(65) Prior Publication Data

US 2019/0095035 A1    Mar. 28, 2019

Related U.S. Application Data

(63) Continuation of application No. 15/189,629, filed on Jun. 22, 2016, now Pat. No. 10,156,929.

(30) Foreign Application Priority Data

Jul. 9, 2015    (JP) ................................. 2015-137957

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC . G06F 2203/04103; G06F 2203/04111; G06F 2203/04112; G06F 3/0412; G06F 3/0416; G06F 3/04
See application file for complete search history.

(56) References Cited

U.S. PATENT DOCUMENTS

2009/0315854 A1    12/2009    Matsuo
2011/0109590 A1    5/2011    Park
2011/0304571 A1*    12/2011    Kim ..................... G02F 1/13338
345/173
(Continued)

FOREIGN PATENT DOCUMENTS

JP    2008-083491    4/2008
JP    2010-2958    1/2010
(Continued)

OTHER PUBLICATIONS

Chinese Office Action dated Mar. 11, 2019 in corresponding Chinese Application No. 201610531780.1.
(Continued)

*Primary Examiner* — Insa Sadio
(74) *Attorney, Agent, or Firm* — K&L Gates LLP

(57) ABSTRACT

A touch detection device and a display device with a touch detection function include: a substrate; a touch detection electrode that is arranged on a plane parallel with the substrate, and that includes a plurality of wires arranged at intervals from one another; and a conductive layer that has a sheet resistance value larger than that of the wires, and that is in contact with and overlaps the wires.

16 Claims, 24 Drawing Sheets

(52) U.S. Cl.
CPC .............. *G06F 2203/04103* (2013.01); *G06F 2203/04111* (2013.01); *G06F 2203/04112* (2013.01)

(56) References Cited

U.S. PATENT DOCUMENTS

| | | |
|---|---|---|
| 2012/0062511 A1 | 3/2012 | Ishizaki |
| 2014/0152613 A1 | 6/2014 | Ishizaki et al. |
| 2014/0299361 A1 | 10/2014 | Nakamura et al. |
| 2014/0333855 A1* | 11/2014 | Park .................. G06F 3/041 349/12 |
| 2015/0170610 A1 | 6/2015 | Kurasawa et al. |
| 2016/0132183 A1 | 5/2016 | Naoi et al. |
| 2018/0110119 A1 | 4/2018 | Nakamura et al. |
| 2018/0110120 A1 | 4/2018 | Nakamura et al. |
| 2019/0008040 A1 | 1/2019 | Nakamura et al. |

FOREIGN PATENT DOCUMENTS

| | | |
|---|---|---|
| JP | 2012-198879 | 10/2012 |
| JP | 2013-077235 | 4/2013 |
| JP | 2013-149232 | 8/2013 |
| JP | 2013-225296 | 10/2013 |
| JP | 2014109904 | 6/2014 |
| JP | 2015-22397 | 2/2015 |
| JP | 2015-115021 | 6/2015 |

OTHER PUBLICATIONS

Japanese Office Action dated Jan. 30, 2019 in corresponding Japanese Application No. 2015-137957.
Japanese Office Action dated Sep. 3, 2019 in corresponding Japanese Application No. 2015-137957.

* cited by examiner

FIG.16

(TABLE 1)

| TOUCH DETECTION ELECTRODE ||| TOUCH DETECTION OPERATION |
|---|---|---|---|
| LINE WIDTH, L [μm] | SPACE WIDTH, S [μm] | ARRANGEMENT AREA RATIO [%] | |
| 2.25 | 250 | 0.89 | OK |
| 4 | 200 | 1.96 | OK |
| 4 | 100 | 3.85 | OK |
| 4 | 50 | 7.41 | OK |
| 4 | 40 | 9.09 | OK |
| 4 | 37.5 | 9.64 | OK |
| 4 | 35 | 10.26 | NG |
| 4 | 32.5 | 10.96 | NG |
| 4 | 30 | 11.76 | NG |
| 10 | 200 | 4.76 | OK |
| 10 | 100 | 9.09 | OK |
| 10 | 90 | 10.00 | OK |
| 10 | 80 | 11.11 | NG |
| 10 | 70 | 12.50 | NG |
| 10 | 60 | 14.29 | NG |
| 10 | 50 | 16.67 | NG |
| 10 | 30 | 25.00 | NG |

TOUCH DETECTION DEVICE AND DISPLAY DEVICE WITH TOUCH DETECTION FUNCTION

CROSS-REFERENCE TO RELATED APPLICATIONS

This application is a continuation of U.S. patent application Ser. No. 15/189,629, filed on Jun. 22, 2016, which application claims priority from Japanese Application No. 2015-137957, filed on Jul. 9, 2015, the contents of which are incorporated by reference herein in its entirety.

BACKGROUND

1. Technical Field

The present disclosure relates to a touch detection device and a display device with a touch detection function.

2. Description of the Related Art

In recent years, attention has been paid for a touch detection device that can detect an external proximity object, or so-called a touch panel. The touch panel is used for a display device with a touch detection function that is mounted on or integrated with a display device such as a liquid crystal display device. The display device with a touch detection function causes the display device to display various button images and the like so that information can be input through the touch panel in place of normal mechanical buttons. In order to achieve a reduction in thickness, an increase in screen size, and higher definition, Japanese Patent Application Laid-open Publication No. 2014-109904 (JP-A-2014-109904) discloses a display device with a touch detection function in which a metallic material is used for touch detection electrodes so as to reduce resistance of the touch detection electrodes and suppress visibility of a pattern of the touch detection electrodes.

In the display device with a touch detection function disclosed in JP-A-2014-109904, the touch detection electrodes include narrow metal wiring, and the area of the touch detection electrodes is small. As a result, when electromagnetic noise such as static electricity comes into the touch detection electrodes from the outside, an electric charge on the touch detection electrode becomes hard to flow to the outside, which may deteriorate touch detection accuracy or display performance of the display device.

SUMMARY

According to an aspect, a touch detection device includes: a substrate; a touch detection electrode that is arranged on a plane parallel with the substrate, and that includes a plurality of wires arranged at intervals from one another; and a conductive layer that has a sheet resistance value larger than that of the wires, and that is in contact with and overlaps the wires.

According to another aspect, a display device with a touch detection function includes: the touch detection device described above; a plurality of pixel electrodes arranged in a matrix facing the touch detection electrode on a plane parallel with the substrate; and a display function layer that exhibits an image display function based on an image signal.

BRIEF DESCRIPTION OF THE DRAWINGS

FIG. 16 is a table illustrating a relation between an arrangement area ratio of the touch detection electrodes with respect to the conductive layer and a touch detection operation;

DETAILED DESCRIPTION

Figure 1:
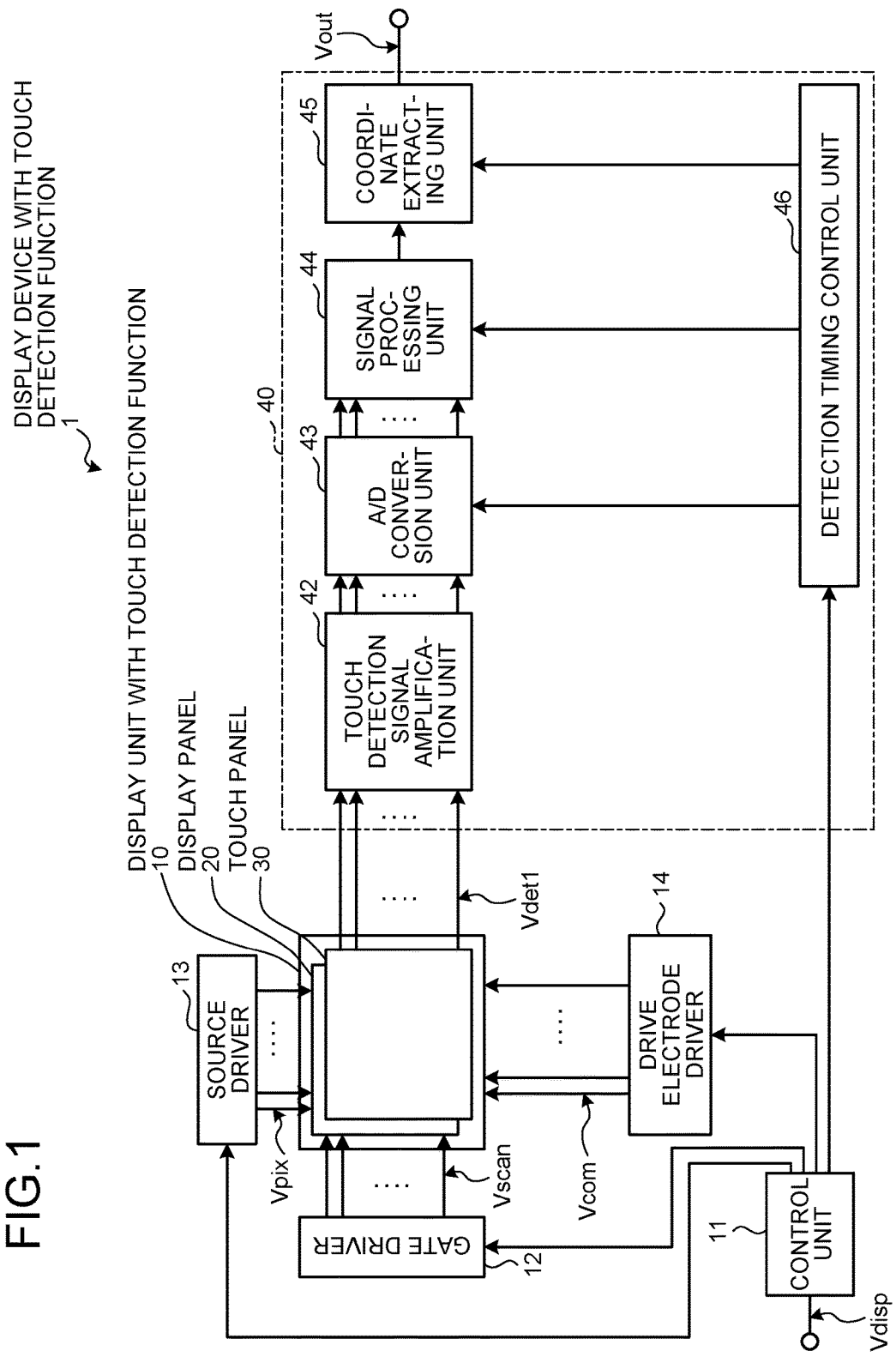
FIG. 1 is a block diagram illustrating a configuration example of a display device with a touch detection function according to a first embodiment of the present invention.

The following describes embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

First Embodiment

FIG. 1 is a block diagram illustrating a configuration example of a display device with a touch detection function according to a first embodiment of the present invention. As illustrated in FIG. 1, a display device 1 with a touch detection function includes a display unit 10 with a touch detection function, a control unit 11, a gate driver 12, a source driver 13, a drive electrode driver 14, and a touch detection unit 40. In the display device 1 with a touch detection function, a touch detection function is incorporated in the display unit 10 with a touch detection function. The display unit 10 with a touch detection function is a device integrating a display panel 20 including a liquid crystal display element as a display element with a touch panel 30 serving as a touch detection device for detecting a touch input. The display unit 10 with a touch detection function may be so-called an on-cell device in which the touch panel 30 is mounted on the display panel 20. The display panel 20 may be, for example, an organic EL display panel.

The display panel 20 is an element that performs display by sequentially scanning each horizontal line in accordance with a scanning signal Vscan supplied from the gate driver 12, which will be described below. The control unit 11 is a circuit that supplies a control signal to each of the gate driver 12, the source driver 13, the drive electrode driver 14, and the touch detection unit 40 based on a video signal Vdisp supplied from the outside to control these components to operate in synchronization with one another.

The gate driver 12 has a function of sequentially selecting one horizontal line to be a display driving target of the display unit 10 with a touch detection function based on the control signal supplied from the control unit 11.

The source driver 13 is a circuit that supplies a pixel signal Vpix to each sub-pixel SPix (described below) in the display unit 10 with a touch detection function based on the control signal supplied from the control unit 11.

The drive electrode driver 14 is a circuit that supplies a drive signal Vcom to a drive electrode COML (described below) in the display unit 10 with a touch detection function based on the control signal supplied from the control unit 11.

The touch panel 30 operates based on the basic principle of capacitance touch detection, and performs a touch detection operation using a mutual capacitance method to detect whether an external conductor is in contact with or in proximity to a display region.

The touch detection unit 40 is a circuit that detects whether there is a touch on the touch panel 30 based on the control signal supplied from the control unit 11 and a touch detection signal Vdet1 supplied from the touch panel 30. The touch detection unit 40 obtains coordinates of the touch, for example. The touch detection unit 40 includes a touch detection signal amplification unit 42, an A/D conversion unit 43, a signal processing unit 44, a coordinate extracting unit 45, and a detection timing control unit 46.

Figure 2:
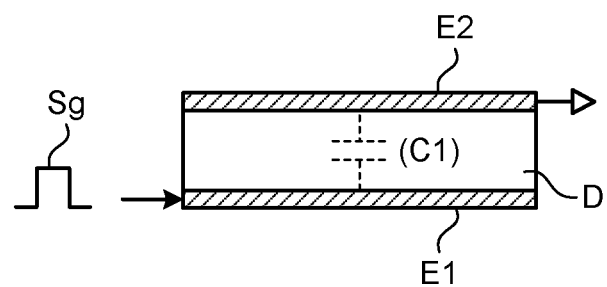
FIG. 2 is a diagram for explaining the basic principle of mutual capacitance type touch detection, illustrating a state in which a finger is neither in contact with nor in proximity to a touch panel.
Figure 3:
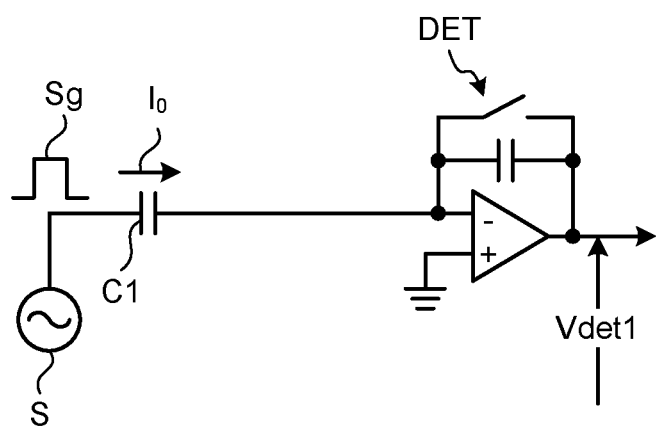
FIG. 3 is a diagram illustrating an example of an equivalent circuit in the state illustrated in FIG. 2 in which the finger is neither in contact nor in proximity to the touch panel.
Figure 4:
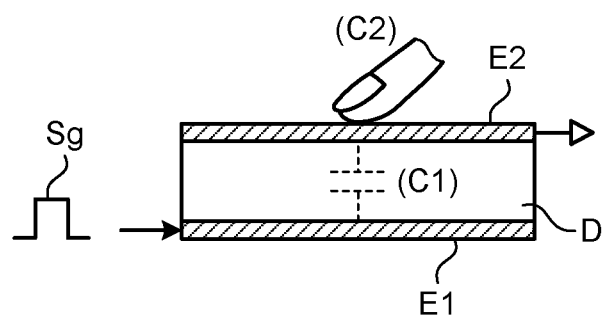
FIG. 4 is a diagram for explaining the basic principle of the mutual capacitance type touch detection, illustrating a state in which a finger is in contact with or in proximity to a touch panel.
Figure 5:
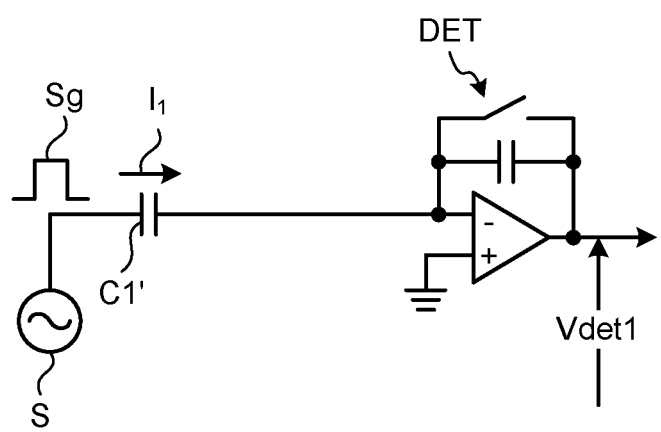
FIG. 5 is a diagram illustrating an example of an equivalent circuit in the state illustrated in FIG. 4 in which the finger is in contact with or in proximity to the touch panel.
Figure 6:
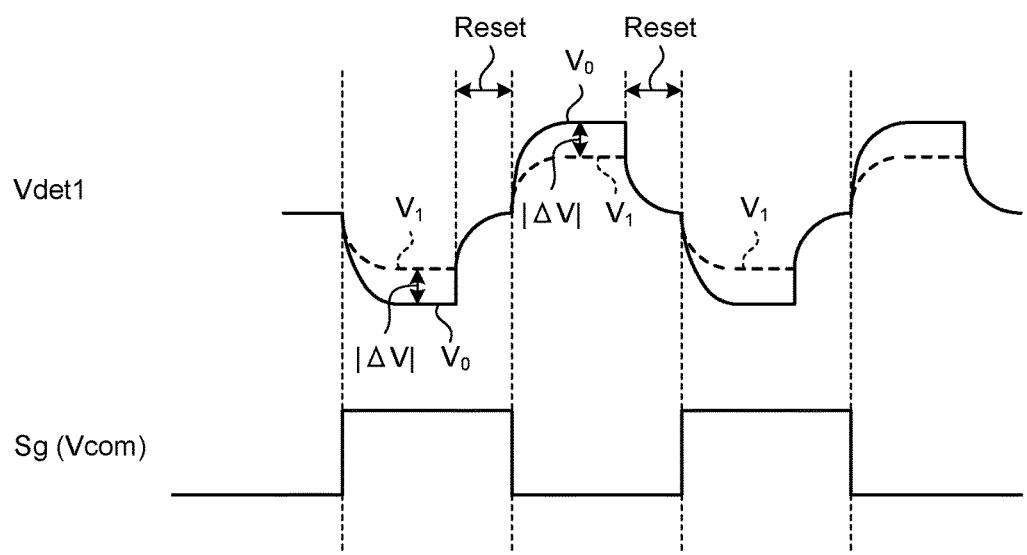
FIG. 6 is a diagram illustrating an example of waveforms of a drive signal and a touch detection signal.

As described above, the touch panel 30 operates based on the basic principle of capacitance touch detection. With reference to FIGS. 2 to 6, the following describes the basic principle of mutual capacitance touch detection performed by the display device 1 with a touch detection function according to the present embodiment. FIG. 2 is a diagram for explaining the basic principle of mutual capacitance type touch detection, illustrating a state in which a finger is neither in contact with nor in proximity to a touch panel. FIG. 3 is a diagram illustrating an example of an equivalent circuit in the state illustrated in FIG. 2 in which the finger is neither in contact nor in proximity to the touch panel. FIG. 4 is a diagram for explaining the basic principle of the mutual capacitance type touch detection, illustrating a state in which a finger is in contact with or in proximity to a touch panel. FIG. 5 is a diagram illustrating an example of an equivalent circuit in the state illustrated in FIG. 4 in which the finger is in contact with or in proximity to the touch panel. FIG. 6 is a diagram illustrating an example of waveforms of a drive signal and a touch detection signal. The following describes a case in which a finger is brought into contact with or in proximity to the touch panel. Alternatively, an object including a conductor such as a stylus pen may be replaced with the finger.

For example, as illustrated in FIG. 2, a capacitive element C1 includes a pair of electrodes, i.e., a drive electrode E1 and a touch detection electrode E2, arranged facing each other with a dielectric D interposed therebetween. As illustrated in FIG. 3, one end of the capacitive element C1 is coupled to an AC signal source (driving signal source) S, and the other end thereof is coupled to a voltage detector (touch detection unit) DET. The voltage detector DET is, for example, an integrating circuit included in the touch detection signal amplification unit 42 illustrated in FIG. 1.

When an AC rectangular wave Sg having a predetermined frequency (for example, about several kHz to several hundreds kilohertz) is applied to the drive electrode E1 (one end of the capacitive element C1) from the AC signal source S, an output waveform (touch detection signal Vdet1) as illustrated in FIG. 6 appears via the voltage detector DET coupled to the touch detection electrode E2 (the other end of the capacitive element C1). The AC rectangular wave Sg corresponds to the drive signal Vcom input from the drive electrode driver 14.

In a state in which the finger is not in contact with or in proximity to the touch panel (non-contact state), as illustrated in FIGS. 2 and 3, current $I_0$ corresponding to a capacitance value of the capacitive element C1 flows in accordance with charge and discharge of the capacitive element C1. The voltage detector DET illustrated in FIG. 3 converts variation in the current $I_0$ corresponding to the AC rectangular wave Sg into variation in a voltage (a waveform $V_0$ of a solid line (refer to FIG. 6)).

On the other hand, in a state in which the finger is in contact with (or in proximity to) the touch panel (contact state), as illustrated in FIG. 4, capacitance C2 formed by the finger is in contact with or in proximity to the touch detection electrode E2, so that capacitance corresponding to a fringe between the drive electrode E1 and the touch detection electrode E2 is shielded. As a result, the capacitive element C1 functions as a capacitive element C1' having a capacitance value smaller than that in the non-contact state. With reference to the equivalent circuit illustrated in FIG. 5, current $I_1$ flows through the capacitive element C1'. As illustrated in FIG. 6, the voltage detector DET converts variation in the current $I_1$ corresponding to the AC rectangular wave Sg into variation in the voltage (a waveform $V_1$ of a dotted line). In this case, amplitude of the waveform $V_1$ is smaller than that of the waveform $V_0$ described above. Accordingly, an absolute value $|\Delta V|$ of a voltage difference between the waveform $V_0$ and the waveform $V_1$ varies depending on influence of a conductor such as a finger that is brought into contact with or proximity to the touch panel from the outside. To accurately detect the absolute value $|\Delta V|$ of the voltage difference between the waveform $V_0$ and the waveform $V_1$, it is more preferable to provide, in an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially performs scanning for each detection block in accordance with the drive signal Vcom supplied from the drive electrode driver 14 to perform mutual capacitance touch detection.

The touch panel 30 outputs the touch detection signal Vdet1 for each detection block via the voltage detector DET illustrated in FIG. 3 or FIG. 5 from touch detection electrodes TDL described below, and supplies the touch detection signal Vdet1 to the touch detection signal amplification unit 42 of the touch detection unit 40.

The touch detection signal amplification unit 42 amplifies the touch detection signal Vdet1 supplied from the touch panel 30. The touch detection signal amplification unit 42 may include an analog low pass filter (LPF) that removes and outputs a high frequency component (noise component) included in the touch detection signal Vdet1.

The A/D conversion unit 43 samples each analog signal output from the touch detection signal amplification unit 42 at timing synchronized with the drive signal Vcom, and converts the analog signal into a digital signal.

The signal processing unit 44 includes a digital filter that reduces a frequency component (noise component) included in the output signal of the A/D conversion unit 43, the frequency being other than a frequency at which the drive signal Vcom is sampled. The signal processing unit 44 is a logic circuit that detects whether there is a touch on the touch panel 30 based on the output signal of the A/D conversion unit 43. The signal processing unit 44 performs processing of extracting only a difference of the detection signal caused by the finger. The signal of the difference caused by the finger has the absolute value $|\Delta V|$ of the difference between the waveform $V_0$ and the waveform $V_1$ described above. The signal processing unit 44 may perform an arithmetic operation for averaging the absolute values $|\Delta V|$ for each detection block to obtain an average value of the absolute values $|\Delta V|$. As a result, the signal processing unit 44 can suppress influence of the noise. The signal processing unit 44 compares the detected signal of the difference caused by the finger with a predetermined threshold voltage. If the signal of the difference is smaller than the threshold voltage, the signal processing unit 44 determines that an external proximity object is in the non-contact state. The signal processing unit 44 compares a detected digital voltage with a predetermined threshold voltage. If the digital voltage is equal to or larger than the threshold voltage, the signal processing unit 44 determines that an external proximity conductor is in the contact state. In this way, the touch detection unit 40 can perform touch detection.

The coordinate extracting unit 45 is a logic circuit that obtains, when a touch is detected by the signal processing unit 44, touch panel coordinates at which the touch is detected. The detection timing control unit 46 controls the A/D conversion unit 43, the signal processing unit 44, and the coordinate extracting unit 45 to operate in synchronization with one another. The coordinate extracting unit 45 outputs the touch panel coordinates as a detection signal output Vout.

Figure 7:
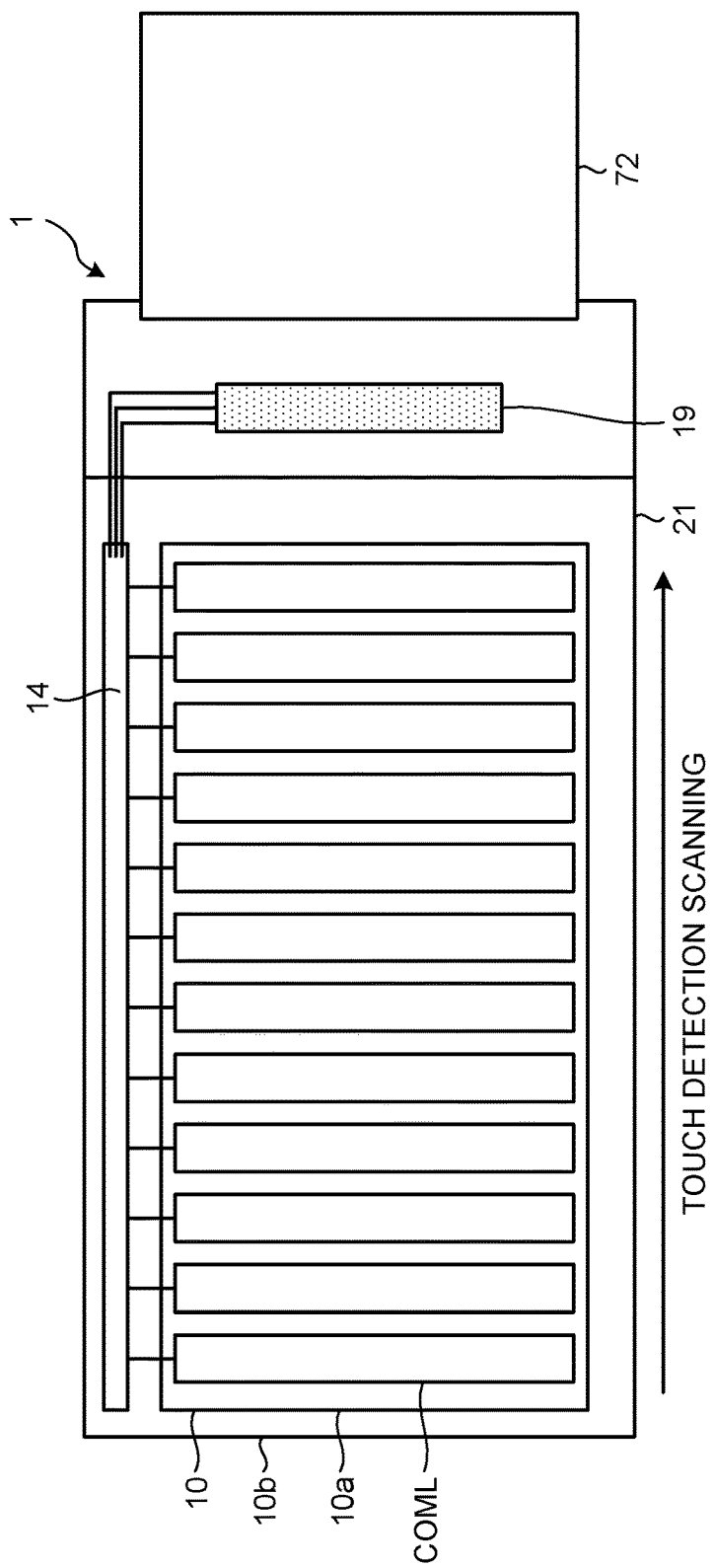
FIG. 7 is a plan view illustrating an example of a module on which the display device with a touch detection function according to the first embodiment is mounted, and illustrating an example of drive electrodes.
Figure 8:
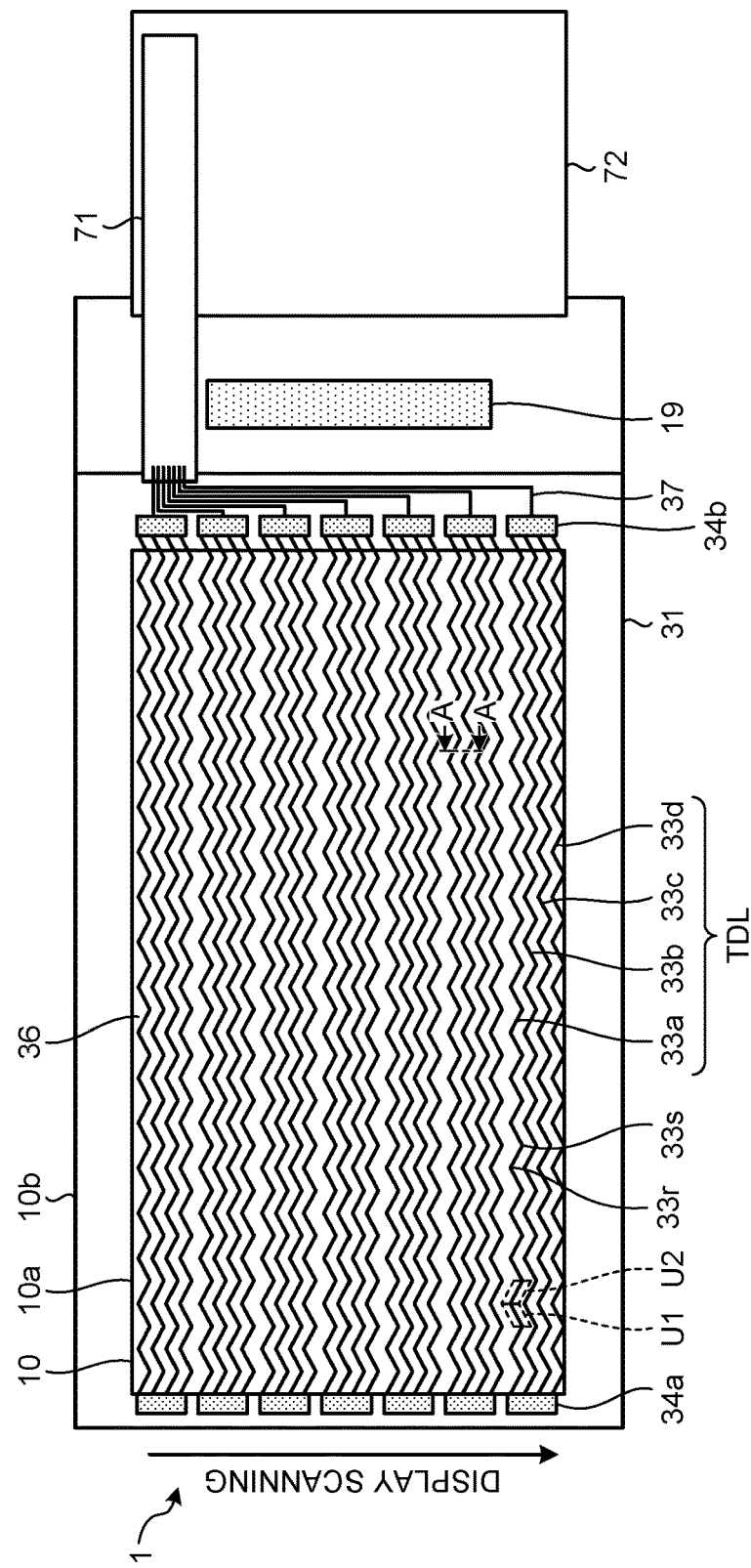
FIG. 8 is a plan view illustrating an example of the module on which the display device with a touch detection function according to the first embodiment is mounted, and illustrating an example of touch detection electrodes.

FIGS. 7 and 8 are plan views each illustrating an example of a module on which the display device with a touch detection function according to the first embodiment is mounted. FIG. 7 is a plan view illustrating an example of the drive electrodes, and FIG. 8 is a plan view illustrating an example of the touch detection electrodes.

As illustrated in FIG. 7, the display device 1 with a touch detection function includes a thin film transistor (TFT) substrate 21 and a flexible printed board 72. On the TFT substrate 21, a chip on glass (COG) 19 is mounted, and a display region 10a of the display panel 20 (refer to FIG. 1) and a frame region 10b surrounding the display region 10a are formed. The COG 19 is a chip of an IC driver mounted on the TFT substrate 21, and incorporates circuits required for a display operation, such as the control unit 11, the gate driver 12, and the source driver 13 illustrated in FIG. 1. According to the present embodiment, the drive electrode driver 14 may be formed on the TFT substrate 21 as a glass substrate. The COG 19 and the drive electrode driver 14 are arranged in the frame region 10b. The COG 19 may incorporate the drive electrode driver 14. In this case, the frame region 10b can be narrowed. The flexible printed board 72 is coupled to the COG 19, and the video signal Vdisp and a power supply voltage are supplied from the outside to the COG 19 via the flexible printed board 72.

As illustrated in FIG. 7, in the display unit 10 with a touch detection function, a plurality of drive electrodes COML are arranged in a region overlapping the display region 10a. The drive electrodes COML extend in a direction along the short side of the display region 10a, and are arranged at intervals in a direction along the long side of the display region 10a. Each of the drive electrodes COML is coupled to the drive electrode driver 14.

As illustrated in FIG. 8, the display device 1 with a touch detection function further includes a glass substrate 31 and a flexible printed board 71. The glass substrate 31 faces the TFT substrate 21 in a direction perpendicular to a surface of the TFT substrate 21 illustrated in FIG. 7. As illustrated in FIG. 8, in the display unit 10 with a touch detection function, a plurality of touch detection electrodes TDL are arranged in a region overlapping the display region 10a. Each of the touch detection electrodes TDL extends in a direction intersecting with an extending direction of the drive electrodes COML illustrated in FIG. 7. The touch detection electrodes TDL are arranged at intervals from one another in the extending direction of the drive electrodes COML. In other words, the drive electrodes COML and the touch detection electrodes TDL are arranged to three-dimensionally intersect with each other, and capacitance is formed at an intersection of the drive electrode COML and the touch detection electrode TDL.

The display device 1 with a touch detection function sequentially performs scanning for each horizontal line in the display operation, which will be described below. In other words, the display device 1 with a touch detection function performs display scanning in parallel with a direction along one side of the display unit 10 with a touch detection function (refer to FIG. 8). The display device 1 with a touch detection function sequentially scans each detection line by sequentially applying the drive signal Vcom to the drive electrode COML from the drive electrode driver 14 in the touch detection operation. In other words, the display unit 10 with a touch detection function performs touch detection scanning in parallel with a direction along the other side of the display unit 10 with a touch detection function (refer to FIG. 7).

As illustrated in FIG. 8, the touch detection electrode TDL according to the present embodiment includes a plurality of wires 33a to 33d. Each of the wires 33a to 33d includes a thin wire piece U1 and a thin wire piece U2 that are inclined with respect to the direction parallel with the long side of the display region 10a, and the thin wire piece U1 and the thin wire piece U2 are inclined in mutually reverse directions. The thin wire piece U1 and the thin wire piece U2 are repeatedly and alternately arranged in the direction parallel with the long side of the display region 10a, and the thin wire piece U1 and the thin wire piece U2 are bent at a bending part 33r and a bending part 33s to be coupled to each other. In this way, the wires 33a to 33d are formed to be a zigzag line or a wavy line having the bending part 33r and the bending part 33s. Each of the thin wire piece U1 and the thin wire piece U2 has a straight line. However, the embodiment is not limited thereto. Each of the thin wire piece U1 and the thin wire piece U2 may have a curved line.

The wires 33a to 33d each have a narrow width, and are arranged at intervals in a direction (the short side direction of the display region 10a) intersecting with the extending direction of the wires 33a to 33d in the display region 10a. Both ends in the extending direction of each of the wires 33a to 33d are coupled to pad parts 34a and 34b arranged in the frame region 10b. As a result, the wires 33a to 33d are electrically coupled to one another, and function as one touch detection electrode TDL. A wire 37 is coupled to each of the pad parts 34b, and the touch detection electrode TDL and the flexible printed board 71 are coupled to each other via the wire 37.

The wires 33a to 33d are made of at least one of metallic materials including aluminum (Al), copper (Cu), silver (Ag), molybdenum (Mo), and an alloy thereof. The wires 33a to 33d may be a laminated body obtained by laminating one or more of the metallic materials. At least one of the metallic materials including aluminum (Al), copper (Cu), silver (Ag), and the alloy thereof has lower resistance than that of translucent conductive oxide such as indium tin oxide (ITO) as a material of a transparent electrode. At least one of the metallic materials including aluminum (Al), copper (Cu), silver (Ag), and the alloy thereof has a light shielding property as compared to the translucent conductive oxide such as ITO, so that a transmittance may be lowered or a pattern of the touch detection electrodes TDL may be visually recognized. In the present embodiment, one touch detection electrode TDL includes the wires 33a to 33d having a narrow width, and the wires 33a to 33d are arranged at intervals larger than the wire width, so that lower resistance and invisibility can be achieved. As a result, resistance of the touch detection electrode TDL is reduced, thereby enabling the display device 1 with a touch detection function to have a reduced thickness, a larger screen size, and higher definition.

The width of each of the wires 33a to 33d is preferably in a range from 2 μm to 10 μm. This is because, when the width of each of the wires 33a to 33d is equal to or smaller than 10 μm, the area of the display region 10a covering an opening is reduced, the opening being a region in which light transmission is not prevented by a black matrix or scanning signal lines GCL and pixel signal lines SGL (described below), thereby lowering a possibility of a decrease in aperture ratio. Additionally, when the width of each of the wires 33a to 33d is equal to or larger than 2 μm, the shape thereof is stabilized, and a possibility of disconnection is reduced.

Figure 9:
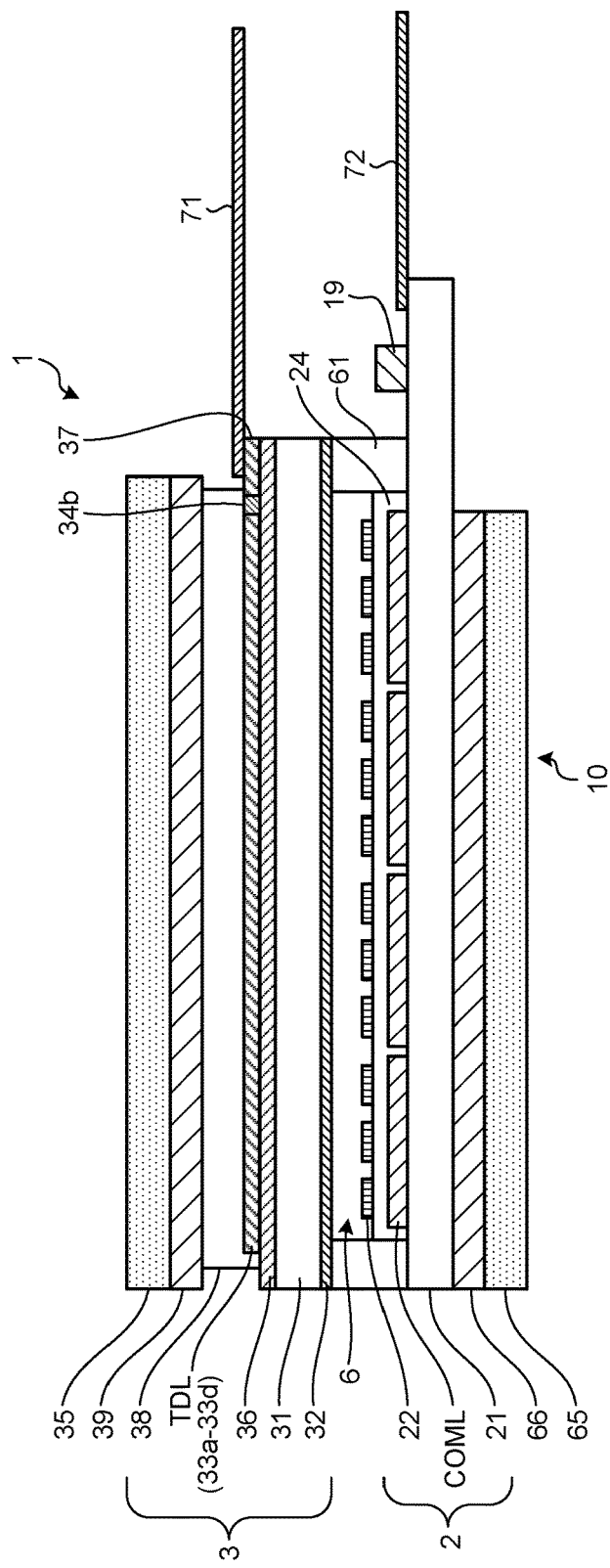
FIG. 9 is a cross-sectional view illustrating a schematic cross-sectional structure of the display device with a touch detection function.

FIG. 9 is a cross-sectional view illustrating a schematic cross-sectional structure of the display device with a touch detection function. As illustrated in FIG. 9, the display unit 10 with a touch detection function includes a pixel substrate 2, a counter substrate 3 arranged facing the pixel substrate 2 in a direction perpendicular to the surface of the pixel substrate 2, and a liquid crystal layer 6 interposed between the pixel substrate 2 and the counter substrate 3.

The pixel substrate 2 includes the TFT substrate 21 serving as a circuit board, a plurality of pixel electrodes 22 arranged in a matrix above the TFT substrate 21, a plurality of drive electrodes COML formed between the TFT substrate 21 and the pixel electrodes 22, and an insulating layer 24 that insulates the pixel electrodes 22 from the drive electrodes COML. A polarizing plate 65 is arranged below the TFT substrate 21 via a bonding layer 66.

The counter substrate 3 includes the glass substrate 31 and a color filter 32 formed on one surface of the glass substrate 31. A conductive layer 36 is arranged on the other surface of the glass substrate 31, and the touch detection electrodes TDL serving as detection electrodes of the touch panel 30 are formed on the conductive layer 36. A protective layer 38 for protecting the wires 33a to 33d of each of the touch detection electrodes TDL is arranged on the touch detection electrodes TDL. The protective layer 38 may be made of a translucent resin such as an acrylic resin. A polarizing plate 35 is arranged above the protective layer 38 via a bonding layer 39.

The TFT substrate 21 and the glass substrate 31 are arranged facing each other with a predetermined gap therebetween formed by a spacer 61. The liquid crystal layer 6 is arranged in a space surrounded by the TFT substrate 21, the glass substrate 31, and the spacer 61. The liquid crystal layer 6 modulates light passing therethrough depending on a state of an electric field. For example, a display panel including liquid crystals of the lateral electric-field mode such as the in-plane switching (IPS) including the fringe field switching (FFS) is used. An orientation film may be arranged between the liquid crystal layer 6 and the pixel substrate 2, and between the liquid crystal layer 6 and the counter substrate 3 illustrated in FIG. 9.

As illustrated in FIG. 9, the conductive layer 36 is arranged on the glass substrate 31, and the touch detection electrodes TDL (the wires 33a to 33d) are arranged on the conductive layer 36. The conductive layer 36 is directly in contact with the wires 33a to 33d of the touch detection electrode TDL, and overlaps the wires 33a to 33d. The conductive layer 36 is formed on almost the entire surface of the glass substrate 31, and is continuously arranged across the entire surface of the display region 10a and the frame region 10b (refer to FIG. 8). Specifically, the conductive layer 36 includes a portion overlapping the wires 33a to 33d and a portion not overlapping the wires 33a to 33d. The portion not overlapping the wires 33a to 33d couples the adjacent wires 33a to 33d to one another. As illustrated in FIG. 8 and FIG. 9, the conductive layer 36 is preferably arranged at a position overlapping the pad parts 34a and 34b and the wires 37.

If the conductive layer 36 is not arranged, when electromagnetic noise such as static electricity comes from the outside, an electric charge on the wires 33a to 33d is hardly eliminated because the wires 33a to 33d each have low resistance and a narrow width. Accordingly, due to the static electricity on the wires 33a to 33d, a change in orientation of liquid crystals in the liquid crystal layer 6 may deteriorate a display quality of the display panel 20, and a change of the touch detection signal Vdet1 may deteriorate touch detection accuracy of the touch panel 30. According to the present embodiment, it is possible to improve an effect of removing the static electricity by arranging the conductive layer 36 to be directly in contact with the wires 33a to 33d.

In the present embodiment, the conductive layer 36 is arranged being in contact with the wires 33a to 33d. The conductive layer 36 overlaps and is directly in contact with the wires 33a to 33d, is continuously arranged among the adjacent wires 33a to 33d in a plan view, and has a larger area than that of the wires 33a to 33d. For example, the conductive layer 36 is grounded through a housing and the like of the display device 1 with a touch detection function. Therefore, even when the electromagnetic noise such as static electricity is applied from the outside and the static electricity is charged on the wires 33a to 33d, the static electricity on the wires 33a to 33d flows to the conductive layer 36. Thus, the conductive layer 36 can eliminate the static electricity charged on the wires 33a to 33d in a short period of time. Accordingly, the display device 1 with a touch detection function according to the present embodiment can improve resistance to the electromagnetic noise such as static electricity.

The conductive layer 36 is, for example, a translucent conductive material including oxide such as tin oxide ($SnO_2$). Examples of the conductive layer 36 include, but are not limited to, an oxide layer including tin oxide ($SnO_2$) and silicon dioxide ($SiO_2$) as main components, an oxide layer including gallium oxide ($Ga_2O_3$), indium oxide ($In_2O_3$), and tin oxide ($SnO_2$) as main components, a translucent conductive layer including ITO as a main material and containing silicon (Si), etc., as disclosed in Japanese Patent Application Laid-open Publication No. 2007-148201 and Japanese Patent Application Laid-open Publication No. 2013-142194. The conductive layer 36 including such an oxide material as a main component hardly degenerates or corrodes the wires 33a to 33d included in the touch detection electrode TDL.

A sheet resistance value of the conductive layer 36 is, for example, $10^9 \Omega/$ to $10^{13} \Omega/$, and the sheet resistance value of the conductive layer 36 is larger than the sheet resistance value of the wires 33a to 33d. With the conductive layer 36 in the above-described range of the sheet resistance value, the static electricity on the wires 33a to 33d flows to the conductive layer 36, and the static electricity can be eliminated in a short period of time. Even when the conductive layer 36 is continuously arranged among the wires 33a to 33d, a short circuit among the touch detection electrodes TDL can be prevented, and a touch input can be detected based on mutual capacitance between the touch detection electrode TDL and the drive electrode COML. The sheet resistance indicates a resistance value between opposing two sides of a resistor having a square shape in a plan view. The sheet resistance value of the conductive layer 36 can be measured, through a known four-terminal method, using a conductive layer deposited on the glass substrate 31 through a sputtering method.

Figure 10:
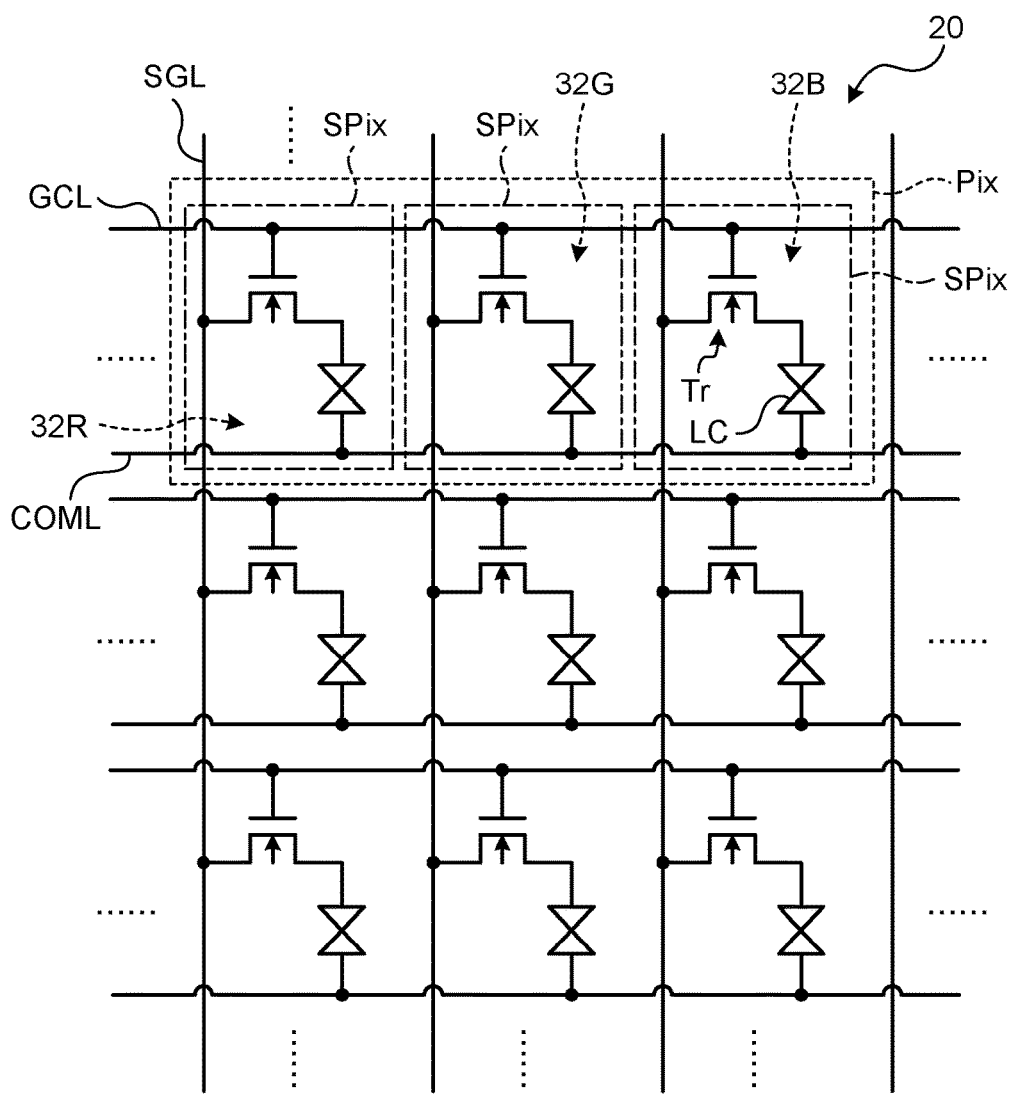
FIG. 10 is a circuit diagram illustrating a pixel array of a display unit with a touch detection function according to the first embodiment.

FIG. 10 is a circuit diagram illustrating a pixel array of the display unit with a touch detection function according to the first embodiment. In the TFT substrate 21 illustrated in FIG. 9, there are formed a thin film transistor element Tr (hereinafter, referred to as a TFT element) of each sub-pixel SPix illustrated in FIG. 10, and wires such as the pixel signal line SGL that supplies the pixel signal Vpix to each pixel electrode 22 and the scanning signal line GCL that drives each TFT element Tr. The pixel signal line SGL and the scanning signal line GCL extend along a plane parallel with the surface of the TFT substrate 21.

The display panel 20 illustrated in FIG. 10 includes a plurality of sub-pixels SPix arranged in a matrix. Each sub-pixel SPix includes the TFT element Tr and a liquid crystal element LC. The TFT element Tr is constituted of a thin film transistor. In this example, the TFT element Tr is constituted of an n-channel metal oxide semiconductor (MOS) TFT. One of a source and a drain of the TFT element Tr is coupled to the pixel signal line SGL, a gate thereof is coupled to the scanning signal line GCL, and the other one of the source and the drain thereof is coupled to one end of the liquid crystal element LC. One end of the liquid crystal element LC is coupled to the other one of the source and the drain of the TFT element Tr, and the other end thereof is coupled to the drive electrode COML.

The sub-pixel SPix is coupled to the other sub-pixel SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixel SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixel SPix belonging to the same row via the drive electrode COML. The drive electrode COML is coupled to the drive electrode driver 14 (refer to FIG. 1), and receives the drive signal Vcom supplied from the drive electrode driver 14. In other words, in this example, a plurality of sub-pixels SPix belonging to the same row share one drive electrode COML. An extending direction of the drive electrode COML in the present embodiment is parallel with an extending direction of the scanning signal line GCL. The extending direction of the drive electrode COML in the present embodiment is not limited thereto. For example, the extending direction of the drive electrode COML may be parallel with an extending direction of the pixel signal line SGL.

The gate driver 12 illustrated in FIG. 1 drives the scanning signal line GCL to sequentially perform scanning. The scanning signal Vscan (refer to FIG. 1) is applied to a gate of the TFT element Tr of the sub-pixel SPix via the scanning signal line GCL, and one horizontal line of the sub-pixels SPix is sequentially selected as the display driving target. The display device 1 with a touch detection function performs display for each horizontal line by the source driver 13 supplying the pixel signal Vpix to the sub-pixels SPix belonging to one horizontal line. In performing this display operation, the drive electrode driver 14 applies the drive signal Vcom to the drive electrode COML corresponding to the one horizontal line.

Figure 11:
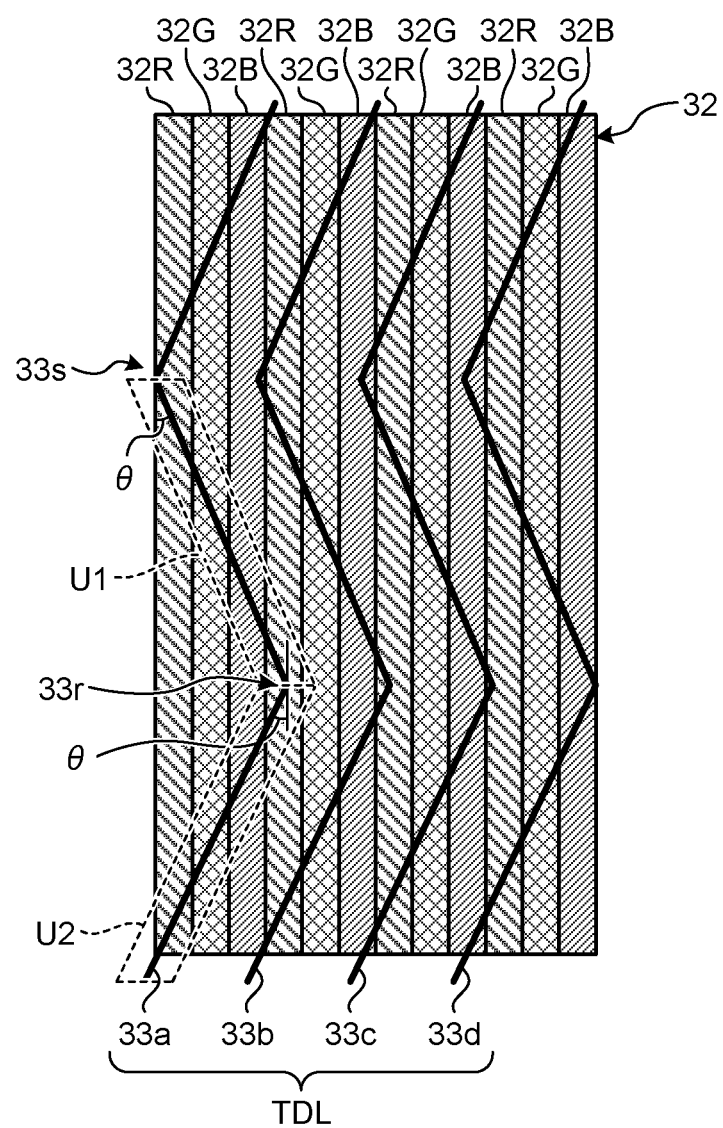
FIG. 11 is a schematic diagram for explaining a relation between an arrangement of the touch detection electrode and color regions of a color filter according to the first embodiment.

FIG. 11 is a schematic diagram for explaining a relation between an arrangement of the touch detection electrode and color regions of the color filter according to the first embodiment. In the color filter 32 illustrated in FIG. 9, color regions 32R, 32G, and 32B colored in three colors, i.e., red (R), green (G), and blue (B), for example, are periodically arranged. The color regions 32R, 32G, and 32B of R, G, and B are associated with respective sub-pixels SPix illustrated in FIG. 10, and a pixel Pix is constituted of the color regions 32R, 32G, and 32B as one set. As illustrated in FIG. 9, the color filter 32 faces the liquid crystal layer 6 in a direction perpendicular to the TFT substrate 21. Another combination of colors may be used for the color filter 32 so long as the colors are different from one another. The number of colors in combination is not limited to three. Alternatively, four or more colors may be combined.

As illustrated in FIG. 11, in the touch detection electrode TDL, the wires 33a to 33d are arranged at predetermined pitches, and the touch detection electrode TDL as a whole extends in a direction parallel with the extending direction of the color regions 32R, 32G, and 32B of the color filter 32. In other words, the touch detection electrode TDL extends in a direction parallel with a direction in which the pixel signal line SGL illustrated in FIG. 10 extends. Each of the wires 33a to 33d is formed to be a zigzag line in which the thin wire piece U1 and the thin wire piece U2 inclined in mutually reverse directions are coupled to each other and are repeatedly arranged, so that the wires 33a to 33d do not shield only a specific color region of the color filters 32 from light. Each of the wires 33a to 33d may be formed to be a wavy line. The thin wire piece U1 and the thin wire piece U2 are inclined in mutually reverse directions at an angle θ with respect to a direction parallel with the extending direction of the color regions 32R, 32G, and 32B. The bending parts 33r and 33s are formed at portions where the thin wire pieces U1 and U2 are coupled to each other, and the bending parts 33r and 33s are regularly provided to the wires 33a to 33d. For example, the angle θ is 5 degrees to 75 degrees, preferably 25 degrees to 40 degrees, and more preferably 50 degrees to 65 degrees.

In this way, the extending direction of the wires 33a to 33d of the touch detection electrode TDL has an angle with respect to the extending direction of the color regions 32R, 32G, and 32B of the color filter 32. As a result, the wires 33a to 33d of the touch detection electrode TDL sequentially shields the color regions 32R, 32G, and 32B of the color filter 32 from light, which can prevent a reduction of transmittance in a specific color region of the color filter 32. The wires 33a to 33d of the touch detection electrode TDL may be arranged un-uniformly in a preferable range. In other words, in the touch detection electrode TDL, distances among the wires 33a to 33d may be different from one another.

Figure 12:
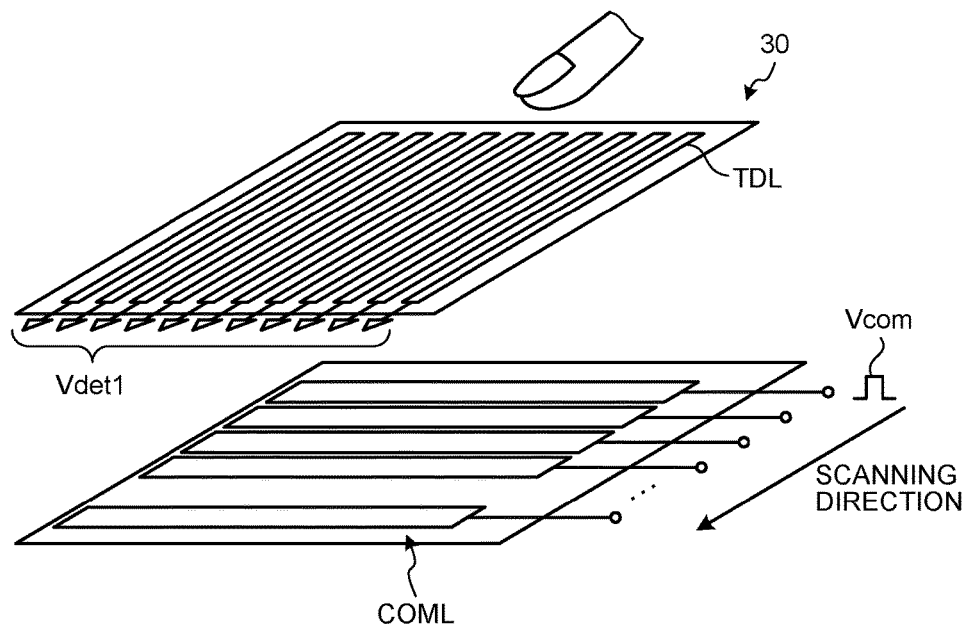
FIG. 12 is a perspective view illustrating a configuration example of the drive electrodes and the touch detection electrodes of the display unit with a touch detection function according to the first embodiment.

The drive electrodes COML illustrated in FIG. 7 and FIG. 9 function as common electrodes that give a common potential to the pixel electrodes 22 of the display panel 20, and also function as drive electrodes for performing mutual capacitance touch detection of the touch panel 30. FIG. 12 is a perspective view illustrating a configuration example of the drive electrodes and the touch detection electrodes of the display unit with a touch detection function according to the first embodiment. The touch panel 30 is constituted of the drive electrodes COML arranged in the pixel substrate 2 and the touch detection electrodes TDL arranged in the counter substrate 3.

The drive electrodes COML are divided into a plurality of stripe electrode patterns extending in the lateral direction of FIG. 12. The touch detection electrodes TDL are constituted of electrode patterns including a plurality of wires (not illustrated in FIG. 12) extending in a direction intersecting with the extending direction of the electrode patterns of the drive electrodes COML. The touch detection electrodes TDL face the drive electrodes COML in a direction perpendicular to the surface of the TFT substrate 21 (refer to FIG. 9). Each of the electrode patterns of the touch detection electrodes TDL is coupled to an input terminal of the touch detection signal amplification unit 42 in the touch detection unit 40 (refer to FIG. 1). The electrode patterns formed by the drive electrodes COML and the touch detection electrodes TDL intersecting each other generate capacitance at intersecting portions therebetween.

For example, a translucent conductive material such as ITO is used for the drive electrode COML. The shape of the touch detection electrode TDL or the drive electrode COML (drive electrode block) is not limited to the shape of stripes divided in to a plurality of portions. For example, the touch detection electrode TDL and the drive electrode COML may have a comb-teeth shape. Alternatively, the touch detection electrode TDL and the drive electrode COML only need to be divided into a plurality of portions, and a slit that divides the drive electrode COML may have a linear shape or a curved shape.

With this configuration, when the touch panel 30 performs a mutual capacitance touch detection operation, the drive electrode driver 14 drives the drive electrode COML to sequentially perform scanning in a time division manner as a drive electrode block, so that one detection block of the drive electrode COML is sequentially selected. When the touch detection signal Vdet1 is output from the touch detection electrode TDL, touch detection for one detection block is performed. In other words, the drive electrode block corresponds to the drive electrode E1 in the basic principle of the mutual capacitance touch detection described above, and the touch detection electrode TDL corresponds to the touch detection electrode E2. The touch panel 30 thus detects a touch input in accordance with the basic principle. As illustrated in FIG. 12, in the touch panel 30, the touch detection electrodes TDL and the drive electrodes COML intersecting with each other constitute capacitance touch sensors in a matrix. Thus, by scanning the entire touch detection surface of the touch panel 30, a position where an external conductor is brought into contact with or proximity to the touch panel 30 can be detected.

As an example of an operation method of the display device 1 with a touch detection function, the display device 1 with a touch detection function performs a touch detection operation (touch detection period) and a display operation (display operation period) in a time division manner. The touch detection operation and the display operation may be performed separately in any manner. The following describes a method of performing each of the touch detection operation and the display operation a plurality of times within one frame period (1F period) of the display panel 20, i.e., a time period required for displaying video information for one screen.

Figure 13:
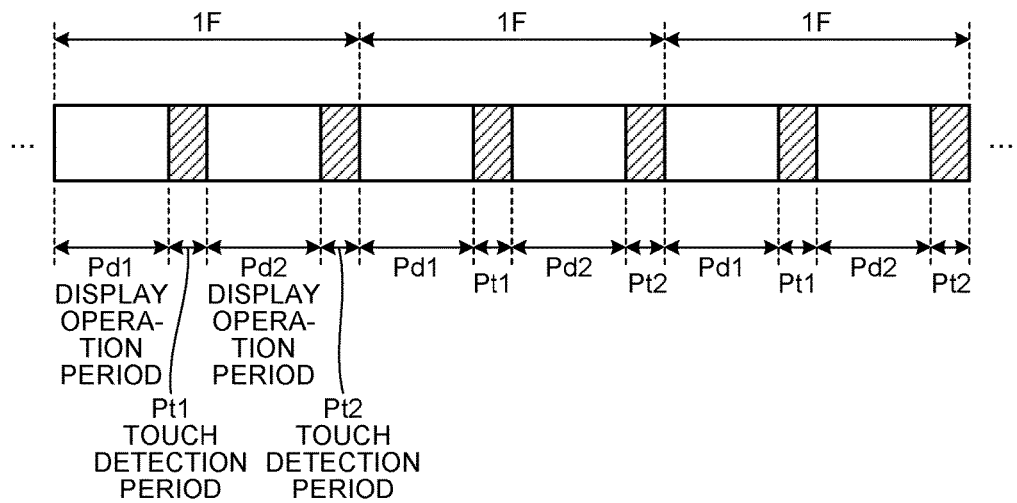
FIG. 13 is a schematic diagram illustrating an arrangement example of a display operation period and a touch detection operation period in one frame period.

FIG. 13 is a schematic diagram illustrating an arrangement example of the display operation period and the touch detection operation period in one frame period. One frame period (1F) includes two display operation periods Pd1 and Pd2, and two touch detection operation periods Pt1 and Pt2. These periods are alternately provided on the time axis in the following order: the display operation period Pd1, the touch detection operation period Pt1, the display operation period Pd2, and the touch detection operation period Pt2.

The control unit 11 (refer to FIG. 1) supplies the pixel signals Vpix to pixels Pix at a plurality of rows (refer to FIG. 10) selected in the respective display operation periods Pd1 and Pd2 via the gate driver 12 and the source driver 13.

The control unit 11 (refer to FIG. 1) supplies the drive signals Vcom for touch detection to the drive electrodes COML (refer to FIG. 12) selected in the respective touch detection operation periods Pt1 and Pt2 via the drive electrode driver 14. The touch detection unit 40 detects whether there is a touch input and performs an arithmetic operation for obtaining coordinates of an input position based on the touch detection signals Vdet1 supplied from the touch detection electrodes TDL.

In the present embodiment, the drive electrodes COML also serves as the common electrodes of the display panel 20, so that the control unit 11 supplies the drive signals Vcom having a common electrode potential for display to the drive electrodes COML selected via the drive electrode driver 14 in the display operation periods Pd1 and Pd2.

When the touch detection operation is performed only with the touch detection electrodes TDL without using the drive electrodes COML, and when touch detection is performed based on the principle of self-capacitance touch detection (described later), for example, the drive electrode driver 14 may supply the drive signals Vcom for touch detection to the touch detection electrodes TDL.

In FIG. 13, video display for one screen is divided into two times in one frame period (1F). Alternatively, the display operation period in one frame period (1F) may be divided into three times or more. The touch detection operation period may also be divided into three times or more in one frame period (1F).

Touch detection for a half of the screen may be performed in each of the touch detection operation periods Pt1 and Pt2, or touch detection for one screen may be performed in each of the touch detection operation periods Pt1 and Pt2. Thinning detection and the like may be performed as needed. Alternatively, each of the display operation and the touch detection operation may be performed once in one frame period (1F) without being divided into a plurality of times.

Figure 14:
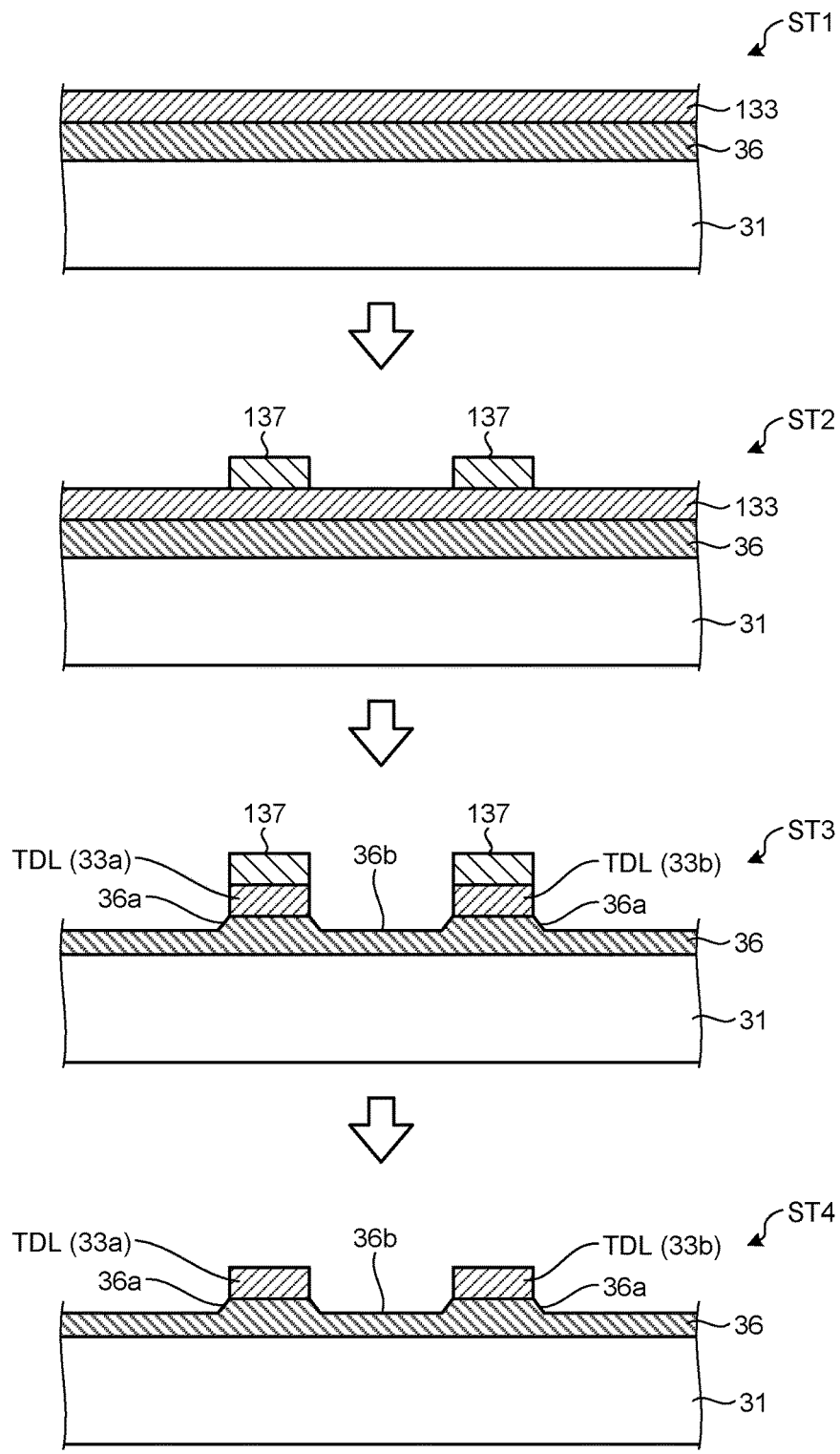
FIG. 14 is a process diagram for explaining a method of manufacturing a conductive layer and the touch detection electrodes according to the first embodiment.

FIG. 14 is a process diagram for explaining a method of manufacturing the conductive layer and the touch detection electrodes according to the first embodiment. FIG. 14 is a cross-sectional view along the line A-A in FIG. 8 viewed from an arrow direction. As illustrated in FIG. 14, at first, the conductive layer 36 is formed on an upper surface of the glass substrate 31 using the material including the oxide described above, and a metal layer 133 is formed on the conductive layer 36 using the metallic material described above (Step ST1). The conductive layer 36 and the metal layer 133 can be continuously deposited in one process through a sputtering method and the like.

Next, a resist 137 is formed on the metal layer 133 (Step ST2). The resist 137 is patterned by photolithography, and formed at a position overlapping a pattern of the wires 33a to 33d illustrated in FIG. 8.

Thereafter, a part of the metal layer 133 exposed from the resist 137 is removed by etching (Step ST3). A part of the metal layer 133 overlapping the resist 137 is not removed by etching, and formed to be patterns of the wires 33a to 33d. As an etchant for the metal layer 133, a phosphate-based etchant such as acetic acid phosphate can be used. In the present embodiment, the conductive layer 36 is made of the translucent conductive material including oxide described above, and includes a polycrystalline structure. Thus, an etching rate of the conductive layer 36 is smaller than that of the metal layer 133 with respect to the etchant for the metal layer 133. When the part of the metal layer 133 not overlapping the resist 137 is removed, the conductive layer 36 serves as an etching stopper to suppress progress of etching. In this case, the part of the conductive layer 36 not overlapping the resist 137 is slightly etched.

Subsequently, by removing the resist 137, the wires 33a and 33b are patterned on the conductive layer 36 (Step ST4). Although FIG. 14 illustrates the wires 33a and 33b, the above process is performed on the entire surface of the glass substrate 31 at the same time. Accordingly, a plurality of touch detection electrodes TDL each including the wires 33a to 33d are formed as illustrated in FIG. 8.

The conductive layer 36 and the wires 33a and 33b are formed through the above process, so that the conductive layer 36 includes a first portion 36a overlapping the wires 33a and 33b and a second portion 36b not overlapping the wires 33a and 33b as illustrated in FIG. 14. The thickness of the first portion 36a of the conductive layer 36 is larger than that of the second portion 36b. The conductive layer 36 is made of a material including a polycrystalline structure, so that the conductive layer 36 is hard to be etched with the etchant for the metal layer 133. Thus, the first portion 36a of the conductive layer 36 is not side-etched, and has a width substantially equal to that of the wires 33a and 33b, or a width slightly larger than that of the wires 33a and 33b. Accordingly, when the protective layer 38 (refer to FIG. 9) is applied on the conductive layer 36 and the wires 33a to 33d by printing and the like, it is possible to prevent a gap from generating between a side surface of the first portion 36a and the protective layer 38.

As illustrated in FIG. 14, the wires 33a and 33b are formed on the conductive layer 36, so that the conductive layer 36 and the metal layer 133 are continuously deposited at one process through a sputtering method and the like (refer to Step ST1 in FIG. 14). Accordingly, it is possible to prevent an increase in the number of sputtering processes for forming the conductive layer 36, and thus prevent an increase in production cost.

Example

Figure 15:
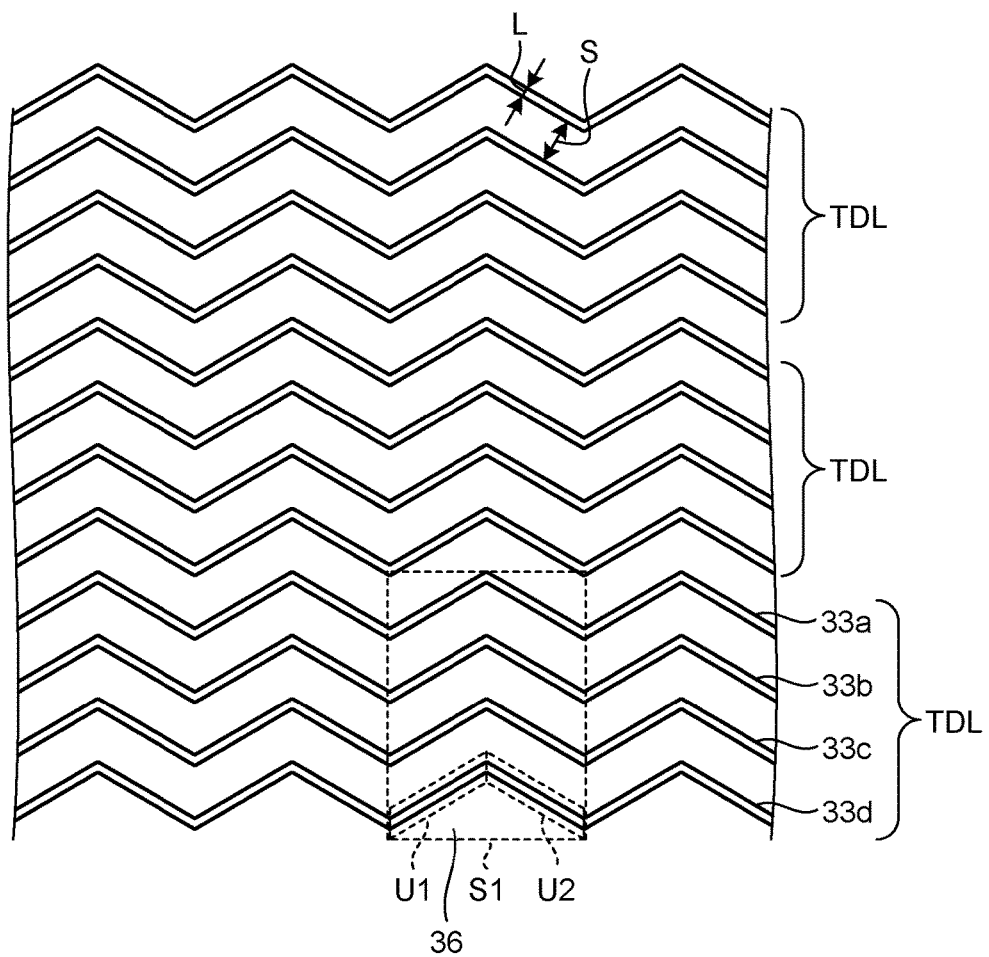
FIG. 15 is a schematic plan view illustrating the touch detection electrodes of the display device with a touch detection function according to an example of the first embodiment.

FIG. 15 is a schematic plan view illustrating the touch detection electrodes of the display device with a touch detection function according to an example of the embodiment. FIG. 16 is a table illustrating a relation between an arrangement area ratio of the touch detection electrodes and a touch detection operation. Table 1 in FIG. 16 illustrates whether it is possible to detect a position where a conductor such as a finger is brought into contact with or proximity to the display device 1 with a touch detection function by changing a line width L and a space width S of the wires 33a to 33d. In FIG. 16, "OK" means that the position of the touch input can be detected, and "NG" means that the position of the touch input is hard to be detected.

As illustrated in FIG. 15, the line width L indicates a width in a direction orthogonal to the extending direction of the wires 33a to 33d, and the space width S indicates a distance between adjacent wires in the direction orthogonal to the extending direction of the wires 33a to 33d. The arrangement area ratio indicates a ratio of the area occupied by the touch detection electrodes TDL (the wires 33a to 33d) with respect to the area of the conductive layer 36 in a plan view. For example, like a region S1 indicated by a dotted line in FIG. 15, a region including the thin wire pieces U1 and U2 of the four wires 33a to 33d may be assumed to be a unit area.

As illustrated in Table 1 of FIG. 16, when the line width L is 4 µm, it is possible to detect the position of the touch input if the space width S is 37.5 µm or larger. When the line width L is 10 µm, it is possible to detect the position of the touch input if the space width S is 90 µm or larger. In other words, the position of the touch input can be detected when the arrangement area ratio of the touch detection electrodes TDL is 10% or lower. The position of the touch input can also be detected when the line width L is 2.25 µm and the space width S is 250 µm, i.e., the arrangement area ratio of the touch detection electrodes TDL is 0.89% or higher.

As illustrated in Table 1 of FIG. 16, the position of the touch input is hard to be detected when the line width L is 4 µm and the space width S is 35 µm or smaller. The position of the touch input is hard to be detected when the line width L is 10 µm and the space width S is 80 µm or smaller. This is because, when the arrangement area ratio of the touch detection electrodes TDL is higher than 10%, the wires may be conducted with one another via the conductive layer 36, and a part of adjacent touch detection electrodes TDL may be conducted with each other.

As described above, according to the present example, the conductive layer 36 is arranged being in contact with the wires 33a to 33d, so that static electricity and the like applied to the wires 33a to 33d from the outside can flow to the conductive layer 36. Additionally, by setting the arrangement area ratio of the touch detection electrode TDL to be 10% or lower, it is possible to prevent the touch detection electrodes TDL from being conducted with each other, and thus detect the position of the touch input.

Second Embodiment

Figure 17:
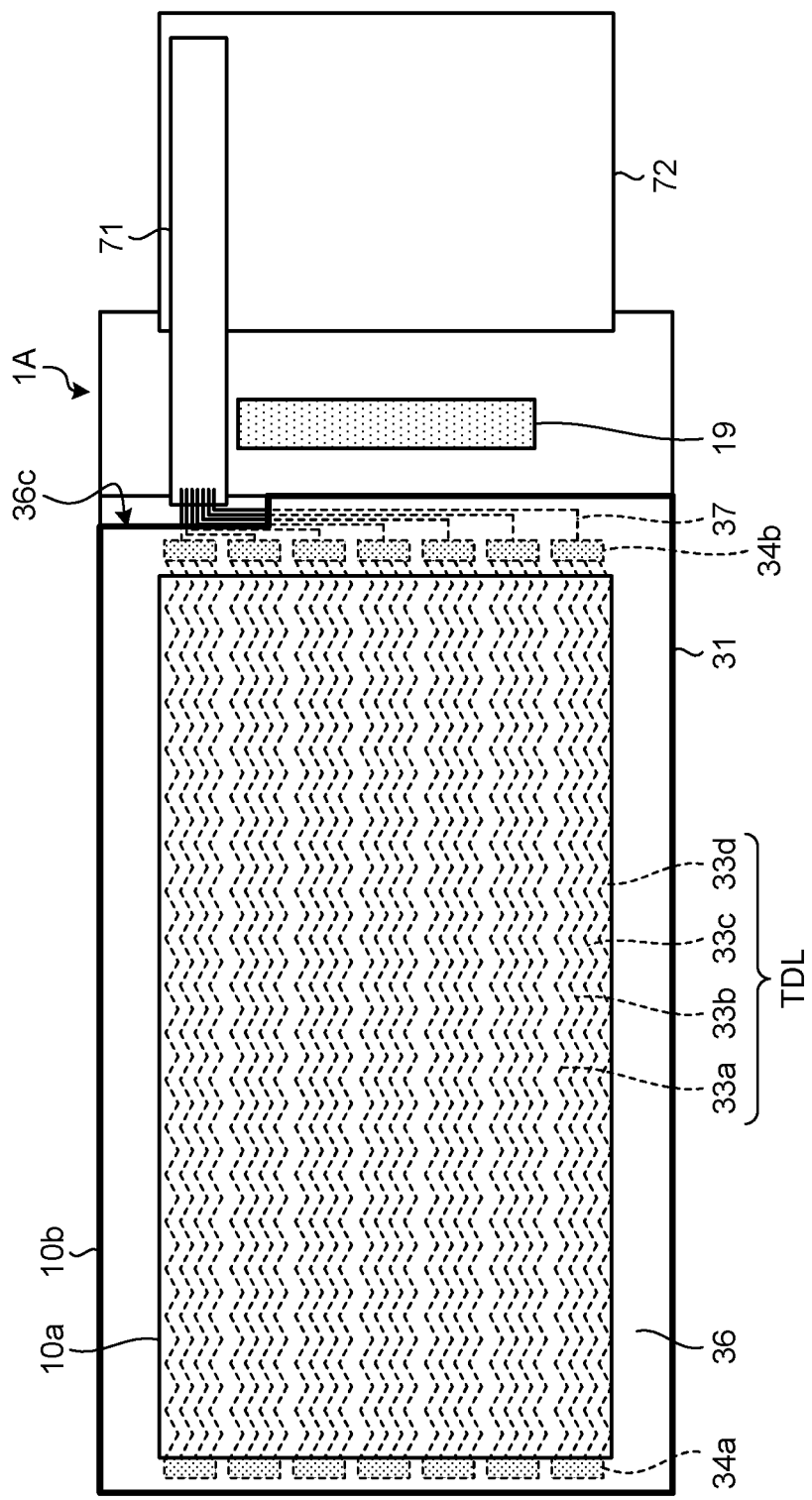
FIG. 17 is a schematic plan view illustrating an example of a display device with a touch detection function according to a second embodiment of the present invention.
Figure 18:
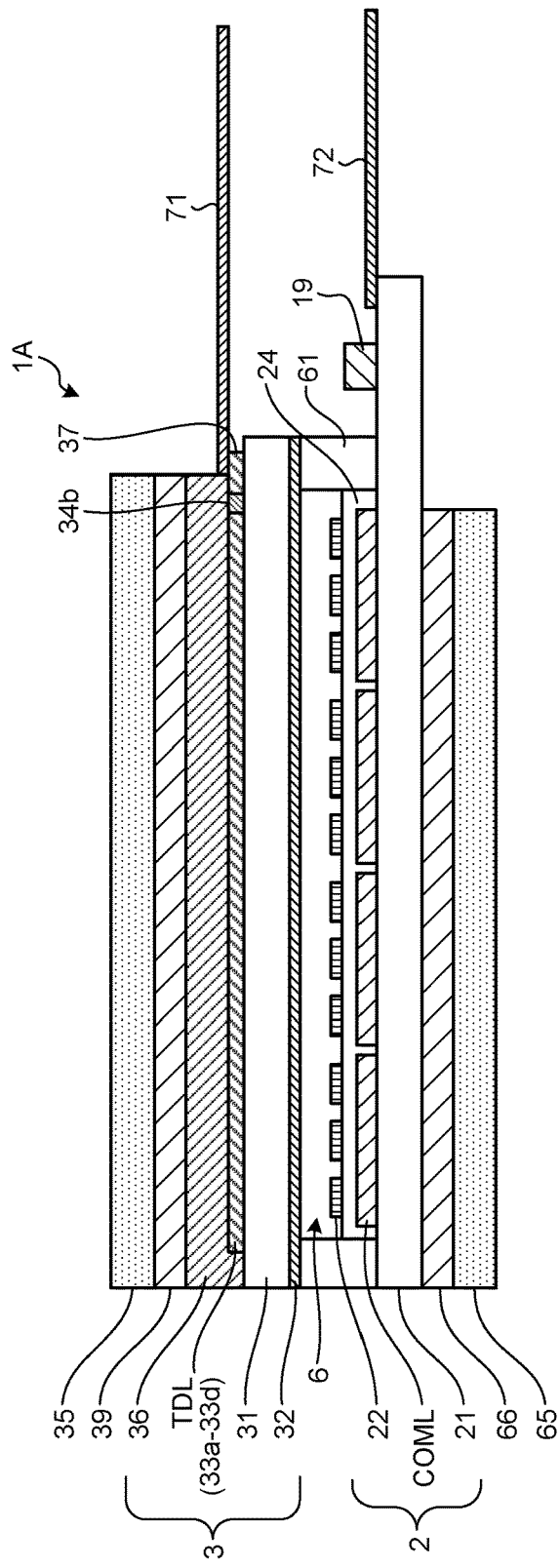
FIG. 18 is a cross-sectional view illustrating a schematic cross-sectional structure of the display device with a touch detection function according to the second embodiment.

FIG. 17 is a schematic plan view illustrating an example of the display device with a touch detection function according to a second embodiment of the present invention. FIG. 18 is a cross-sectional view illustrating a schematic cross-sectional structure of the display device with a touch detection function according to the second embodiment. As illustrated in FIG. 17, similarly to the first embodiment, the touch detection electrode TDL includes a plurality of wires 33a to 33d. As illustrated in FIG. 18, a display device 1A with a touch detection function according to the present embodiment is different from the display device 1 with a touch detection function of the first embodiment in that the touch detection electrodes TDL and the conductive layer 36 are stacked on the glass substrate 31 in this order. In other words, the wires 33a to 33d are arranged on the glass substrate 31, and the conductive layer 36 is arranged at least above the wires 33a to 33d.

As illustrated in FIG. 17, the conductive layer 36 is arranged across almost the entire surface of the glass substrate 31, and overlaps a plurality of touch detection electrodes TDL, pad parts 34a and 34b, and the wires 37. A recessed part 36c recessed inward is arranged at a part of an outer circumference of the conductive layer 36, and a part of the wires 37 is exposed at a position overlapping with the recessed part 36c. The wires 37 exposed at the recessed part 36c are coupled to the flexible printed board 71.

Also in the present embodiment, the conductive layer 36 is continuously arranged among adjacent wires 33a to 33d, is directly in contact with the wires 33a to 33d, and overlaps the wires 33a to 33d. The conductive layer 36 has a larger area than that of the wires 33a to 33d. Therefore, even when electromagnetic noise such as static electricity comes into the wires 33a to 33d from the outside, the static electricity charged on the wires 33a to 33d flows to the conductive layer 36. Thus, the conductive layer 36 can eliminate the static electricity charged on the wires 33a to 33d in a short period of time. Accordingly, the display device 1A with a touch detection function according to the present embodiment can improve resistance to the noise from the outside such as static electricity.

In the present embodiment, the conductive layer 36 is arranged on the wires 33a to 33d, so that the conductive layer 36 also functions as a protective layer that protects the wires 33a to 33d. Accordingly, the display device 1A with a touch detection function may be configured without the protective layer 38 illustrated in FIG. 9, and the polarizing plate 35 is arranged on the conductive layer 36 via the bonding layer 39. The conductive layer 36 is arranged between the wires 33a to 33d and the bonding layer 39, so that the wires 33a to 33d are prevented from being corroded by components of the bonding layer 39, for example. Further, there is less limitation on materials used as the bonding layer 39.

The conductive layer 36 may be made of the translucent conductive material described above through a sputtering method. In this case, the conductive layer 36 needs to be deposited separately from the wires 33a to 33d. The conductive layer 36 may be formed using a resin material including the translucent conductive material described above through a printing method and the like. In this case, it is possible to suppress an increase in the production cost.

Third Embodiment

Figure 19:
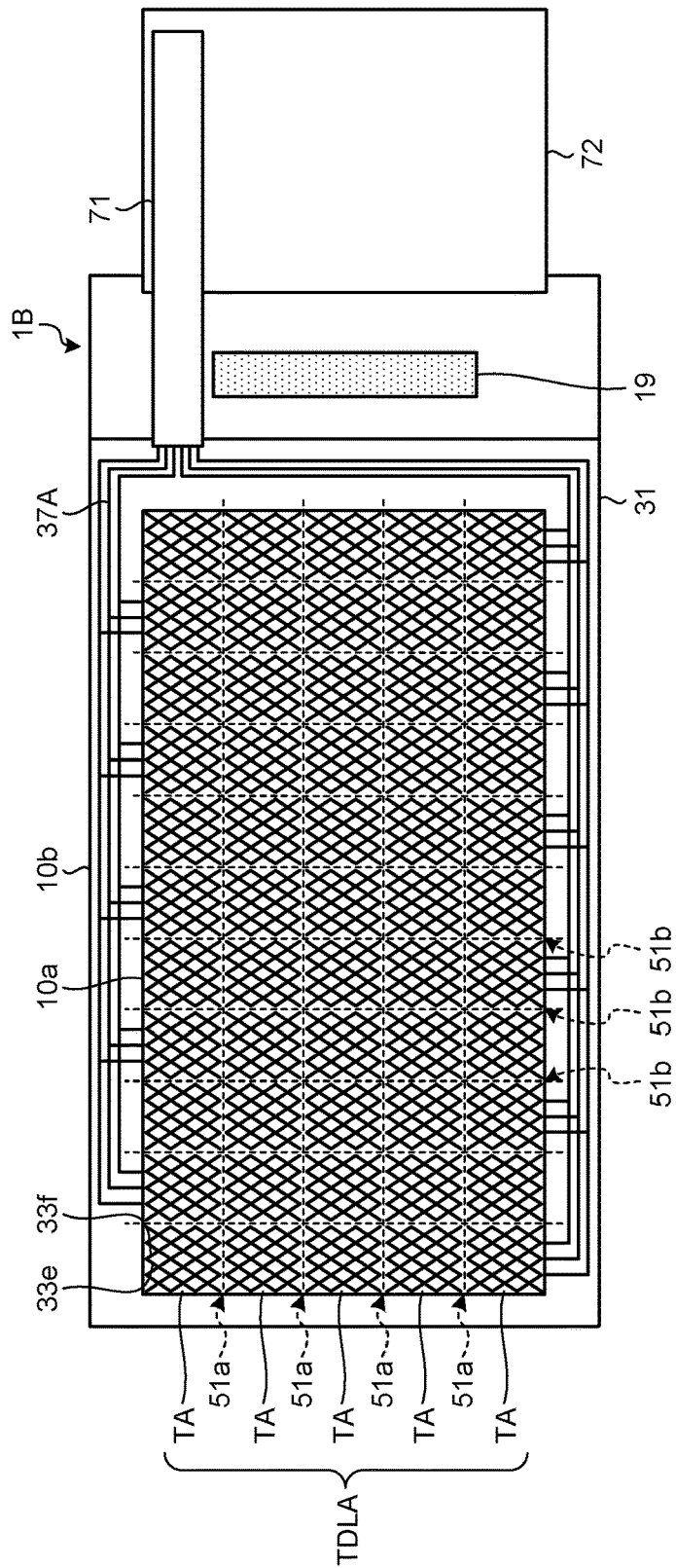
FIG. 19 is a schematic plan view illustrating an example of a display device with a touch detection function according to a third embodiment of the present invention.
Figure 20:
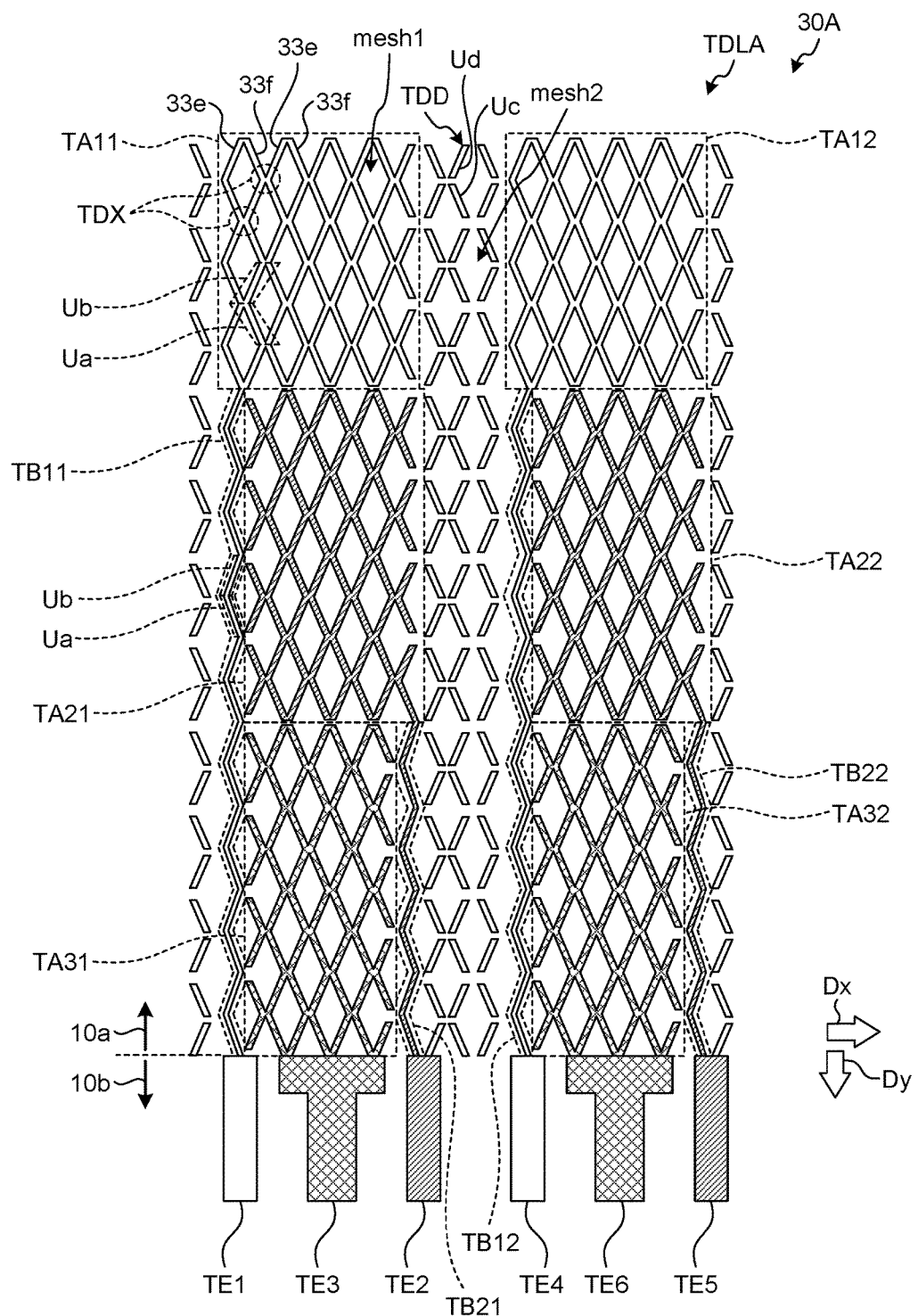
FIG. 20 is a schematic plan view illustrating touch detection electrode of the display device with a touch detection function according to the third embodiment in a partially enlarged manner.
Figure 21:
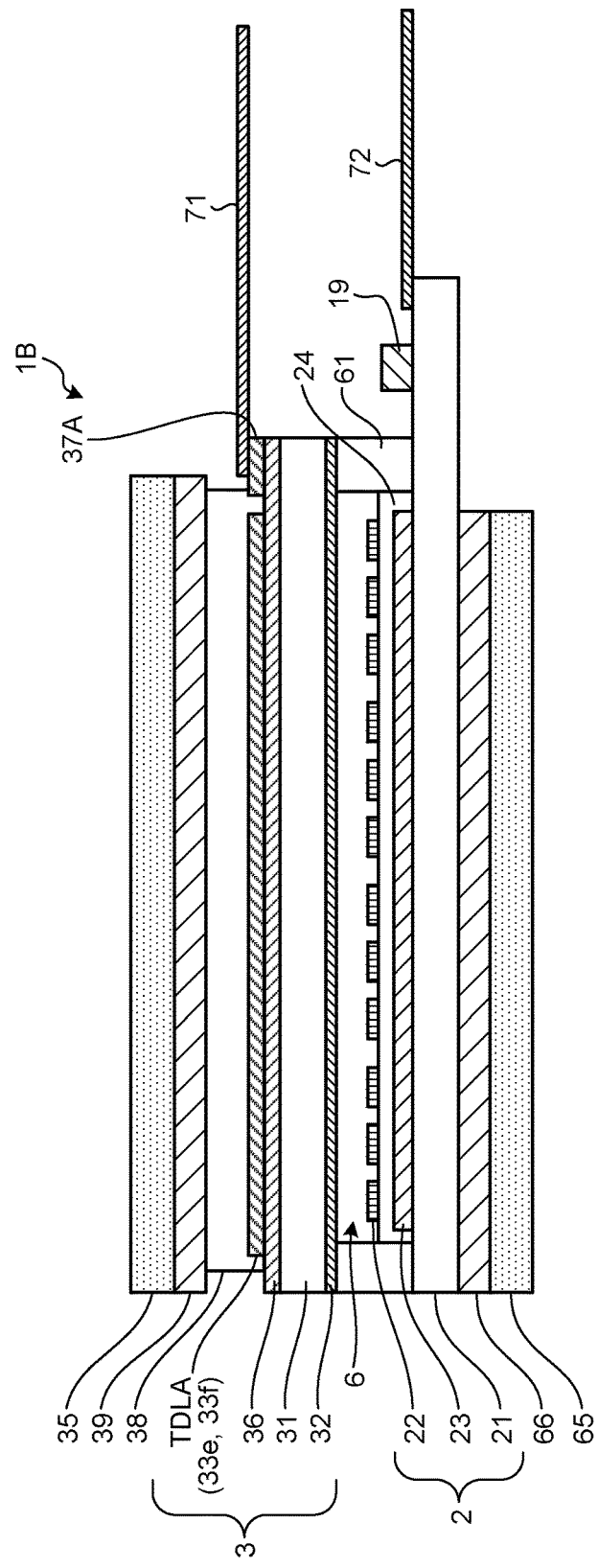
FIG. 21 is a cross-sectional view illustrating a schematic cross-sectional structure of the display device with a touch detection function according to the third embodiment.

FIG. 19 is a schematic plan view illustrating an example of the display device with a touch detection function according to a third embodiment of the present invention. FIG. 20 is a schematic plan view illustrating the touch detection electrode of the display device with a touch detection function according to the third embodiment in a partially enlarged manner. FIG. 21 is a cross-sectional view illustrating a schematic cross-sectional structure of the display device with a touch detection function according to the third embodiment.

In the display devices 1 and 1A with a touch detection function according to the first embodiment and the second embodiment, the drive electrodes COML of the display unit 10 with a touch detection function serve as the common electrodes that give a common potential to the pixel electrodes 22 of the display panel 20, and also serve as drive electrodes for performing mutual capacitance touch detection of the touch panel 30. In a display device 1B with a touch detection function according to the third embodiment, the touch panel 30 is mounted on the display panel 20, and the touch panel 30 performs self-capacitance touch detection.

As illustrated in FIG. 19, a touch detection electrode TDLA according to the present embodiment includes a plurality of small electrode parts TA arranged in a matrix. The small electrode parts TA include a plurality of wires 33*e* and a plurality of wires 33*f* extending in a direction along the short side of the display region 10*a*. The wires 33*e* and the wires 33*f* each form a zigzag line or a wavy line, and are symmetric about a symmetric axis that is a straight line parallel with the short side of the display region 10*a*. The wires 33*e* and the wires 33*f* are alternately arranged in a direction along the long side of the display region 10*a*, so that mesh-like wires are formed on almost the entire surface of the display region 10*a*.

As illustrated in FIG. 19, the wires 33*e* and 33*f* are electrically isolated from the wires 33*e* and 33*f* of an adjacent small electrode part TA by a slit arranged at a position indicated by a dotted line 51*a*, and a slit arranged at a position indicated by a dotted line 51*b*. Accordingly, the small electrode parts TA are arranged in a matrix being separated from one another. The small electrode parts TA are coupled to the flexible printed board 71 via the wires 37A arranged in the frame region 10*b*. Each of the small electrode parts TA functions as a touch detection electrode, and the display device 1B with a touch detection function according to the present embodiment can detect contact or proximity of the external conductor based on self capacitance of the small electrode parts TA. The small electrode parts TA each constitute a capacitance touch sensor and are arranged in a matrix in the display region 10*a*, so that the position where the external conductor is brought into contact with or proximity to the touch panel can be detected by scanning the entire touch detection surface of the touch panel 30.

Figure 22:
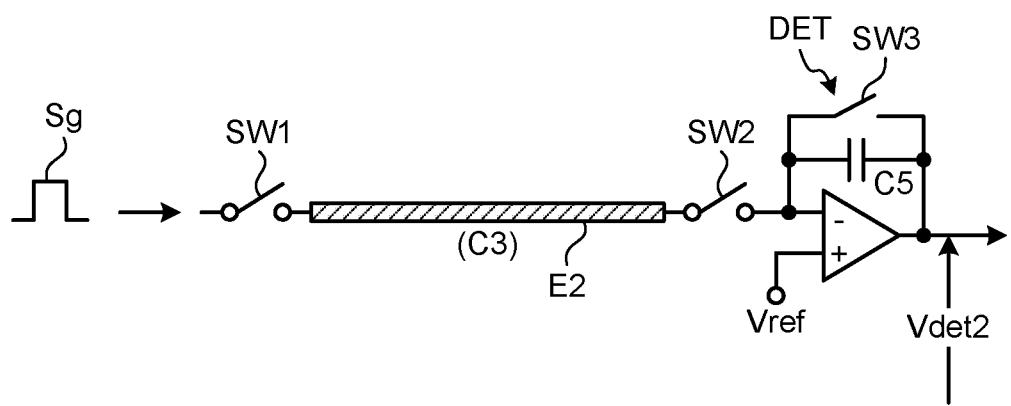
FIG. 22 is a diagram for explaining the basic principle of self-capacitance type touch detection, illustrating a state in which a finger is neither in contact with nor in proximity to a touch panel.
Figure 23:
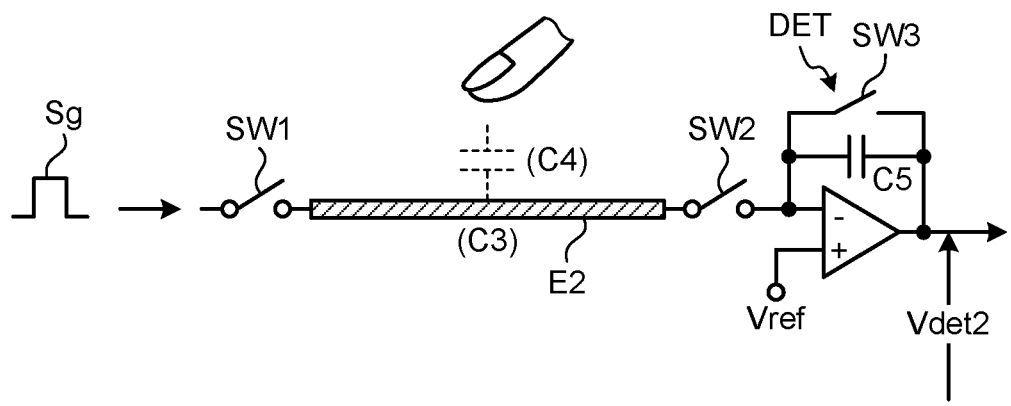
FIG. 23 is a diagram for explaining the basic principle of the self-capacitance type touch detection, illustrating a state in which a finger is in contact with or in proximity to a touch panel.
Figure 24:
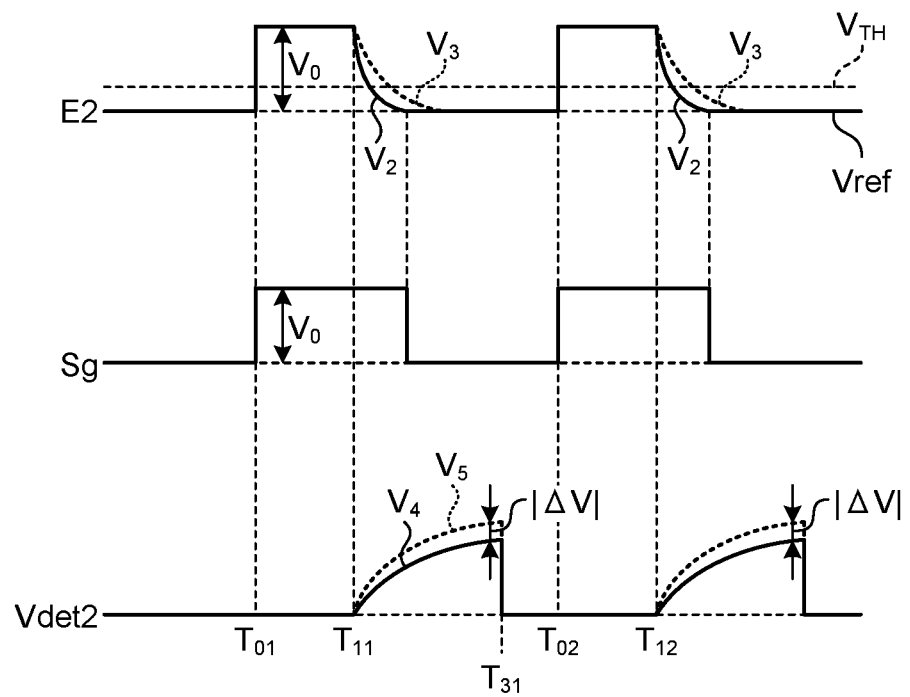
FIG. 24 is a diagram illustrating an example of waveforms of a drive signal and a touch detection signal.

The following describes the basic principle of self-capacitance touch detection performed by the display device 1B with a touch detection function according to the present embodiment, with reference to FIGS. 22 to 24. FIG. 22 is a diagram for explaining the basic principle of self-capacitance type touch detection, illustrating a state in which a finger is neither in contact with nor in proximity to a touch panel. FIG. 23 is a diagram for explaining the basic principle of the self-capacitance type touch detection, illustrating a state in which a finger is in contact with or in proximity to a touch panel. FIG. 24 is a diagram illustrating an example of waveforms of a drive signal and a touch detection signal. FIGS. 22 and 23 also illustrate a detection circuit.

As illustrated in FIG. 22, in a state in which the finger is not in contact with or in proximity to the touch panel, the AC rectangular wave Sg having a predetermined frequency (for example, about several kHz to several hundreds kilohertz) is applied to the touch detection electrode E2. The touch detection electrode E2 has capacitance C3, and current corresponding to the capacitance C3 flows therethrough. The voltage detector DET converts variation in the current corresponding to the AC rectangular wave Sg into variation in the voltage (a waveform $V_4$ of a solid line (refer to FIG. 24)).

Next, as illustrated in FIG. 23, in a state in which the finger is in contact with or in proximity to the touch panel, capacitance C4 between the finger and the touch detection electrode E2 is added to the capacitance C3 of the touch detection electrode E2. Accordingly, when the AC rectangular wave Sg is applied to the touch detection electrode E2, current corresponding to the capacitance C3 and the capacitance C4 flows therethrough. As illustrated in FIG. 24, the voltage detector DET converts variation in the current corresponding to the AC rectangular wave Sg into variation in the voltage (a waveform $V_5$ of a dotted line). It is possible to determine whether the finger is in contact with or in proximity to the touch detection electrode E2 by integrating respective voltage values of the obtained waveform $V_4$ and waveform $V_5$ to be compared with each other. In FIG. 24, respective periods until the voltages of the waveform $V_4$ and the waveform $V_5$ are lowered to a predetermined reference voltage may be obtained to be compared with each other, for example.

Specifically, as illustrated in FIGS. 22 and 23, the touch detection electrode E2 is configured to be disconnectable from a power source and the voltage detector DET by a switch SW1 and a switch SW2, respectively. In FIG. 24, the AC rectangular wave Sg raises a voltage level corresponding to a voltage $V_0$ at time $T_{01}$. At this point, the switch SW1 is turned on, and the switch SW2 is turned off. Accordingly, the voltage of the touch detection electrode E2 is also raised to the voltage $V_0$. Next, the switch SW1 is turned off before time $T_{11}$. At this point, although the touch detection electrode E2 is in a floating state, an electric potential of the touch detection electrode E2 is maintained to be $V_0$ due to the capacitance C3 of the touch detection electrode E2 (refer to FIG. 22), or capacitance obtained by adding the capacitance C4 caused by contact or proximity of the finger and the like to the capacitance C3 of the touch detection electrode E2 (C3+C4, refer to FIG. 23). Additionally, a switch SW3 is turned on before the time $T_{11}$, and is turned off after a predetermined time has elapsed to reset the voltage detector DET. Through this reset operation, an output voltage becomes substantially equal to Vref.

Subsequently, when the switch SW2 is turned on at the time $T_{11}$, a voltage of a reverse input unit of the voltage detector DET becomes the voltage $V_0$ of the touch detection electrode E2. Thereafter, the voltage of the reverse input unit of the voltage detector DET is lowered to a reference voltage Vref in accordance with a time constant of the capacitance C3 of the touch detection electrode E2 (or C3+C4) and that of capacitance C5 in the voltage detector DET. At this point, an electric charge accumulated in the capacitance C3 of the touch detection electrode E2 (or C3+C4) moves to the capacitance C5 in the voltage detector DET, so that an output of the voltage detector DET is increased (Vdet2). When the finger and the like is not in proximity to the touch detection electrode E2, the output (Vdet2) of the voltage detector DET takes the waveform $V_4$ indicated by a solid line, and Vdet2=C3×$V_0$/C5 is satisfied. When capacitance caused by influence of the finger and the like is added, the output (Vdet2) takes the waveform $V_5$ indicated by a dotted line, and Vdet2=(C3+C4)×$V_0$/C5 is satisfied.

Thereafter, by turning off the switch SW2 at time T31 after the electric charge of the capacitance C3 of the touch detection electrode E2 (or C3+C4) sufficiently moves to the capacitance C5 and turning on the switch SW1 and the switch SW3, the electric potential of the touch detection electrode E2 is reduced to be at a low level that is equal to the electric potential of the AC rectangular wave Sg, and the voltage detector DET is reset. In this case, the timing for turning on the switch SW1 may be any timing after the switch SW2 is turned off and before time $T_{02}$. The timing for resetting the voltage detector DET may be any timing after the switch SW2 is turned off and before time $T_{12}$. The above operations are repeated at a predetermined frequency (for example, about several kHz to several hundreds kilohertz). Whether there is an external proximity object (whether there is a touch) can be detected based on the absolute value |ΔV| of a difference between the waveform $V_4$ and the waveform $V_5$. As illustrated in FIG. 24, the electric potential of the touch detection electrode E2 takes a waveform of $V_2$ when the finger or the like is not in proximity to the electrode, and takes a waveform of $V_3$ when the capacitance C4 caused by influence of the finger or the like is added. Whether there is an external proximity object (whether there is a touch) can also be detected by measuring a time period until the voltages of the waveform $V_2$ and the waveform $V_3$ are lowered to a predetermined voltage $V_{TH}$.

In the present embodiment, in the touch panel 30, electric charges are supplied to the small electrode parts TA in accordance with drive signals Vx supplied from the drive electrode driver 14 illustrated in FIG. 1 to perform self-capacitance touch detection. Each of the small electrode parts TA outputs the touch detection signal Vdet2 to the touch detection unit 40, and the touch detection unit 40 detects whether there is a touch input and performs an arithmetic operation of the coordinates of the input position.

Next, the following describes a specific configuration of the touch detection electrode TDLA according to the present embodiment. In FIG. 20, a direction orthogonal to the arrangement direction of the sub-pixels SPix illustrated in FIG. 10 (extending direction of the scanning signal line GCL) is assumed to be a first direction Dx, and the arrangement direction of the sub-pixels SPix (extending direction of the pixel signal line SGL) is assumed to be a second direction Dy.

As illustrated in FIG. 20, the touch detection electrode TDLA according to the present embodiment includes small electrode parts TA11, TA21, TA31, TA12, TA22, and TA32. The small electrode part TA11 includes a plurality of wires 33e and a plurality of wires 33f extending in the second direction Dy on a plane parallel with the counter substrate 3 (refer to FIG. 21). The wires 33e and the wires 33f are alternately arranged and are coupled to each other in the first direction Dx. The wires 33e and the wires 33f are made of the same material, i.e., any of the metallic materials described above.

In the wires 33e and the wires 33f arranged in the first direction Dx, a bending part of the wire 33e and a bending part of the wire 33f are coupled to each other to form an intersecting part TDX. The wires 33e and the wires 33f are conducted with each other at the intersecting part TDX. As a result, the wire 33e and the wire 33f form a surrounded region mesh1 surrounded by a thin wire piece Ua and a thin wire piece Ub. The wire 33e and the wire 33f are not necessarily coupled to each other at the bending part. For example, the wire 33e and the wire 33f may be coupled to each other and conducted with each other at an intermediate part of the thin wire piece Ua in the wire 33e and an intermediate part of the thin wire piece Ub in the wire 33f. An extending direction of the wires 33e and 33f is a direction along a straight line connecting one end and the other end of the wire 33e or the wire 33f. The extending direction of the wires 33e and 33f is the second direction Dy. The wires 33e and 33f each form a zigzag line or a wavy line. Each of the small electrode parts TA21, TA31, TA12, TA22, and TA32 has the same configuration as that of the electrode part TA11.

The small electrode part TA11 is coupled to a terminal part TE1 formed in the frame region 10b via a wiring part TB11. The wiring part TB11 is configured such that a plurality of thin wire pieces Ua and a plurality of thin wire pieces Ub are alternately arranged being coupled to each other in the second direction Dy, and extends from the small electrode part TA11 to the frame region 10b in the second direction Dy. The small electrode part TA21 is coupled to a terminal part TE2 formed in the frame region 10b via a wiring part TB21 extending from the small electrode part TA21 to the frame region 10b in the second direction Dy. The small electrode part TA12 is coupled to a terminal part TE4 formed in the frame region 10b via a wiring part TB12 extending from the small electrode part TA12 to the frame region 10b in the second direction Dy. The small electrode part TA22 is coupled to a terminal part TE5 formed in the frame region 10b via a wiring part TB22 extending from the small electrode part TA22 to the frame region 10b in the second direction Dy. Each of the wiring parts TB21, TB12, and TB22 is configured such that the thin wire pieces Ua and the thin wire pieces Ub are alternately arranged being coupled to each other in the second direction Dy similarly to the wiring part TB11. The small electrode part TA31 is positioned at an end of the display region 10a, so that the wires 33e and 33f constituting the small electrode part TA31 are directly coupled to a terminal part TE3 formed in the frame region 10b without a wiring part. Similarly, the small electrode part TA32 is positioned at an end of the display region 10a, so that the wires 33e and 33f constituting the small electrode part TA32 are directly coupled to a terminal part TE6 formed in the frame region 10b without using a wiring part. The terminal parts TE1 to TE6 are coupled to the respective wires 37A illustrated in FIG. 19.

A dummy electrode TDD includes a thin wire piece Uc and a thin wire piece Ud. The thin wire piece Uc has substantially the same shape as that of the thin wire piece Ua. The thin wire piece Ud has substantially the same shape as that of the thin wire piece Ub. The thin wire piece Uc is arranged in parallel with the thin wire piece Ua, and the thin wire piece Ud is arranged in parallel with the thin wire piece Ub. The thin wire piece Uc and the thin wire piece Ud are arranged so that the area of a surrounded region mesh2 surrounded by two thin wire pieces Uc and two thin wire pieces Ud is the same as that of the surrounded region mesh1. Accordingly, in the display device 1B with a touch detection function, it is possible to reduce a difference in light shielding property between a region in which the touch detection electrode TDLA is arranged and a region in which the touch detection electrode TDLA is not arranged, thereby lowering a possibility that the touch detection electrode TDLA tends to be visually recognized.

With the above configuration, in the display device 1B with a touch detection function according to the third embodiment, even if either of the wire 33e and the wire 33f is partially narrowed and conduction is not secured, the wire is coupled to the other wire at the intersecting part TDX, so that a probability of touch detection can be enhanced.

As illustrated in FIG. 21, the conductive layer 36 is arranged between the touch detection electrode TDLA and the glass substrate 31, and is directly in contact with and overlaps the wires 33e and 33f of the touch detection electrode TDLA. The conductive layer 36 is arranged across almost the entire surface of the glass substrate 31, and is continuously arranged across the entire surface of the display region 10a and the frame region 10b illustrated in FIGS. 19 and 20. In other words, the conductive layer 36 overlaps the small electrode parts TA11 to TA32, the dummy electrodes TDD, and the terminal parts TE1 to TE6 illustrated in FIG. 20.

The conductive layer 36 is arranged in the configuration of the touch detection electrode TDLA according to the present embodiment, so that even when static electricity is applied to the wires 33e and 33f from the outside, the static electricity on the wires 33e and 33f flows to the conductive layer 36. As a result, the static electricity on the wires 33e and 33f can be eliminated in a short period of time.

As illustrated in FIG. 20, the display device 1B with a touch detection function according to the present embodiment includes a plurality of dummy electrodes TDD. The dummy electrodes TDD are electrodes that do not function as the touch detection electrodes, and are arranged being separated from the small electrode parts TA11 to TA32, the terminal parts TE1 to TE6, and the wiring parts TB11 and TB22. Therefore, if the conductive layer 36 is not arranged, when the static electricity is applied to the dummy electrodes TDD from the outside and the dummy electrodes TDD are charged with electricity, the electric charge on the dummy electrodes TDD is hard to flow to the outside. Thus, it is difficult to eliminate the static electricity on the dummy electrodes TDD, so that a display quality of the display panel 20 may be deteriorated and touch detection accuracy of the touch panel 30 may be deteriorated due to the static electricity on the dummy electrodes TDD. In the present embodiment, the conductive layer 36 is arranged being in contact with the dummy electrodes TDD and overlap the dummy electrodes TDD, so that the static electricity on the dummy electrodes TDD flows through the conductive layer 36. As a result, the static electricity on the dummy electrodes TDD can be eliminated in a short period of time. Accordingly, the display device 1B with a touch detection function according to the present embodiment can improve resistance to the electromagnetic noise such as static electricity.

The display device 1B with a touch detection function according to the present embodiment performs touch detection based on self capacitance of the touch detection electrode TDLA. Thus, as illustrated in FIG. 21, a common electrode 23 is arranged on the TFT substrate 21 in place of the drive electrode COML (refer to FIG. 9). The common electrode 23 is an electrode for giving a common potential to a plurality of pixel electrodes 22 of the display panel 20, and is continuously arranged on the TFT substrate 21.

Also in the present embodiment, the display operation and the self-capacitance touch detection operation may be performed in a time division manner. As described above, in touch detection periods Pt1 and Pt2, the drive signal Vx is supplied to the touch detection electrode TDLA. The common electrode 23 may be in a floating state in which a voltage signal is not applied thereto and the electric potential thereof is not fixed in the touch detection periods Pt1 and Pt2. A voltage signal at the same level as the drive signal Vx may be applied to the common electrode 23 together with the drive signal Vx at the same time, and the common electrode 23 may be driven as an active shield.

In the present embodiment, the drive electrode COML (refer to FIG. 9) may be arranged on the TFT substrate 21 side in place of the common electrode 23, and touch detection may be performed based on mutual capacitance of the drive electrode COML and the touch detection electrode TDLA.

Fourth Embodiment

Figure 25:
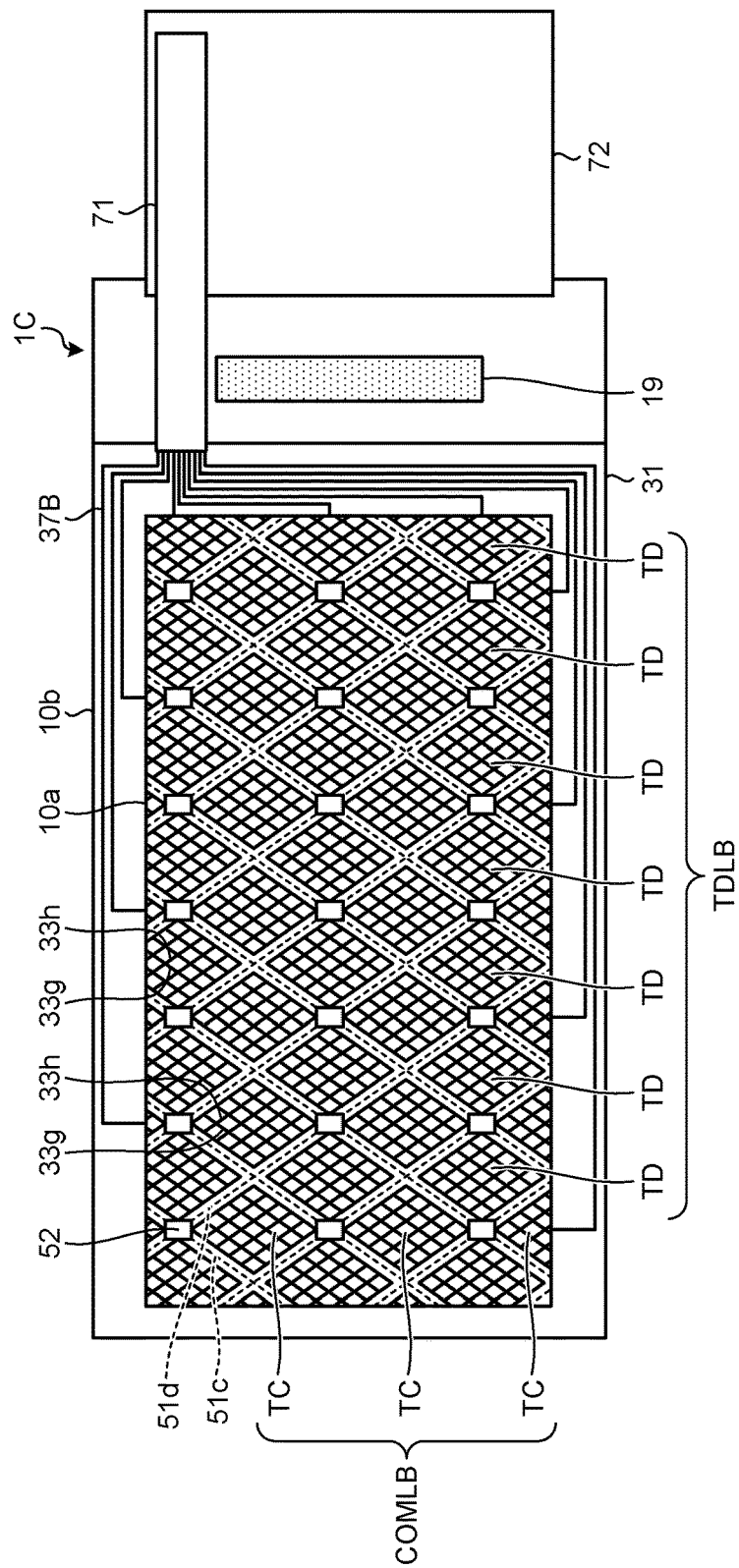
FIG. 25 is a schematic plan view illustrating an example of a display device with a touch detection function according to a fourth embodiment.
Figure 26:
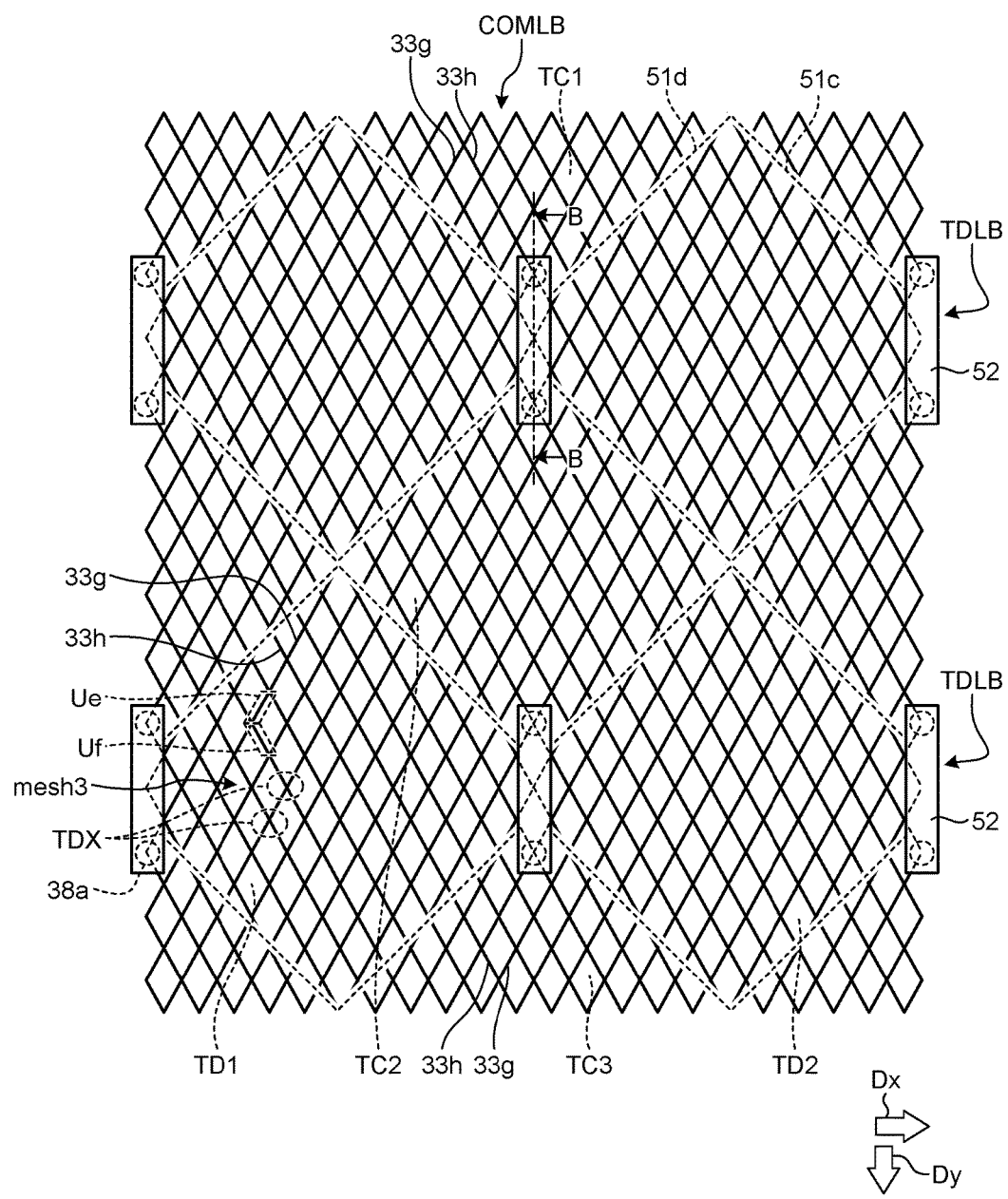
FIG. 26 is a schematic plan view illustrating a touch detection electrode of the display device with a touch detection function according to the fourth embodiment in an enlarged manner.
Figure 27:
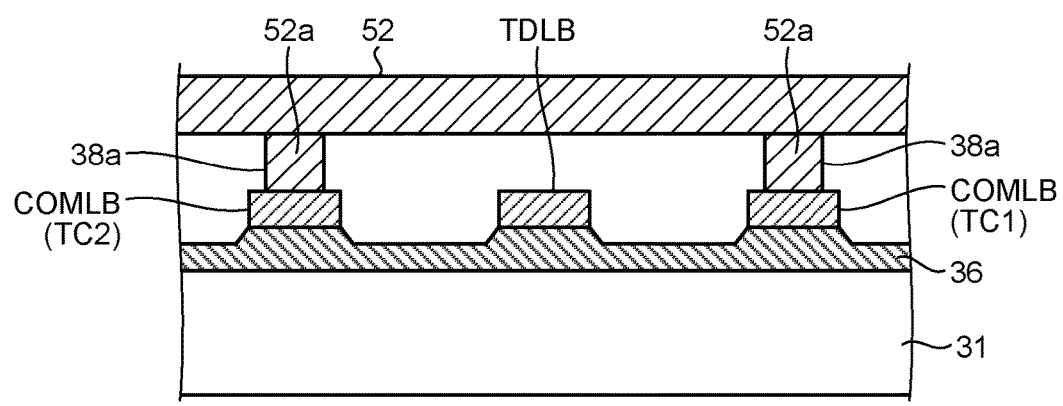
FIG. 27 is a schematic cross-sectional view along the line B-B in FIG. 26 viewed from an arrow direction.
Figure 28:
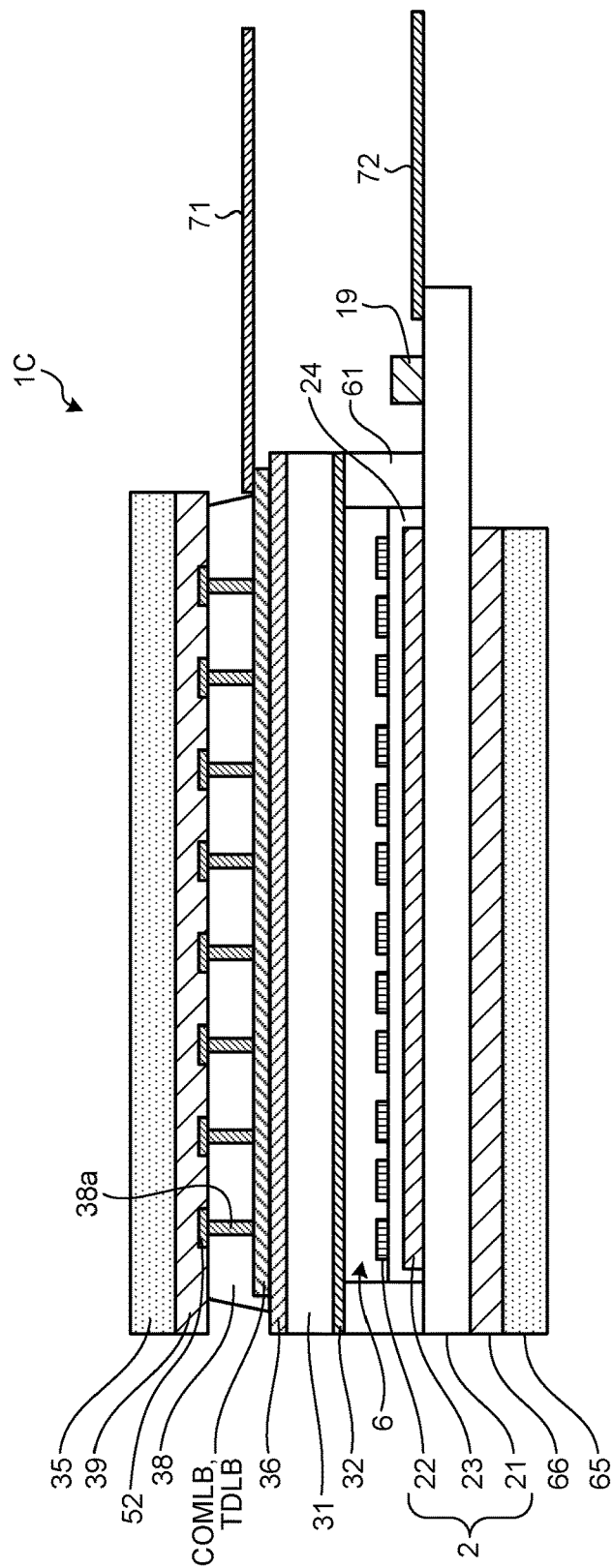
FIG. 28 is a cross-sectional view illustrating a schematic cross-sectional structure of the display device with a touch detection function according to the fourth embodiment.

FIG. 25 is a schematic plan view illustrating an example of the display device with a touch detection function according to a fourth embodiment. FIG. 26 is a schematic plan view illustrating the touch detection electrode of the display device with a touch detection function according to the fourth embodiment in an enlarged manner. FIG. 27 is a schematic cross-sectional view along the line B-B in FIG. 26 viewed from an arrow direction. FIG. 28 is a cross-sectional view illustrating a schematic cross-sectional structure of the display device with a touch detection function according to the fourth embodiment.

As illustrated in FIG. 25, in a display device 1C with a touch detection function according to the present embodiment, a drive electrode COMLB and a touch detection electrode TDLB are arranged on the same plane parallel with the glass substrate 31.

The drive electrode COMLB includes a plurality of small electrode parts TC. The small electrode part TC has a diamond shape, and the small electrode parts TC are arranged in a direction along the short side of the display region 10a. The small electrode parts TC arranged in the direction along the short side of the display region 10a are coupled to one another via bridge parts 52. As illustrated in FIG. 28, the protective layer 38 is arranged on the drive electrode COMLB and the touch detection electrode TDLB, and the bridge part 52 is arranged on the protective layer 38. The drive electrode COMLB and the bridge parts 52 are arranged in different layers, and electrically coupled to each other via through holes 38a provided to the protective layer 38. One drive electrode COMLB is formed of a column of the small electrode parts TC that are arranged in a direction along the short side of the display region 10a and coupled to one another via the bridge parts 52. A plurality of drive electrodes COMLB are arranged in a direction along the long side of the display region 10a.

The touch detection electrode TDLB includes a plurality of small electrode parts TD. The small electrode part TD has a planar diamond shape substantially equal to the shape of the small electrode part TC of the drive electrode COMLB. The small electrode parts TD are arranged in a direction along the long side of the display region 10a, and coupled to one another at a position overlapping the bridge parts 52. One touch detection electrode TDLB is formed of the small electrode parts TD arranged in the direction along the long side of the display region 10a. A plurality of touch detection electrodes TDLB are arranged in the direction along the short side of the display region 10a.

As illustrated in FIG. 25, the drive electrode COMLB and the touch detection electrode TDLB include wires 33g and wires 33h extending in the direction along the short side of the display region 10a. The wires 33g and wires 33h each form a zigzag line or a wavy line, and are symmetric about a symmetric axis that is a straight line parallel with the short side of the display region 10a. The wires 33g and the wires 33h are alternately arranged in a direction along the long side of the display region 10a, so that mesh-like wires are formed on almost the entire surface of the display region 10a. The wires 33g and 33h are electrically isolated from the wires 33g and 33h of another small electrode part by a slit arranged at a position along dotted lines 51c and 51d in FIG. 25. The small electrode part TC of the drive electrode COMLB and the small electrode part TD of the touch detection electrode TDLB each include the wire 33g and wire 33h isolated from each other by the slit.

The drive electrode COMLB is coupled to a wire 37B on the long side of the display region 10a. The touch detection electrode TDLB is coupled to the wire 37B on the short side of the display region 10a. The wires 37B are arranged in the frame region 10b to couple the drive electrode COMLB to the flexible printed board 71, and couple the touch detection electrode TDLB to the flexible printed board 71.

The display device 1C with a touch detection function according to the present embodiment detects a position where the external conductor approaches or is in proximity to the touch panel based on mutual capacitance of the drive electrode COMLB and the touch detection electrode TDLB. The touch panel 30 detects a touch input in accordance with the basic principle of mutual capacitance touch detection described above.

The following describes a specific configuration of the drive electrode COMLB and the touch detection electrode TDLB according to the present embodiment. As illustrated in FIG. 26, the drive electrode COMLB includes small electrode parts TC1, TC2, and TC3. The touch detection electrode TDLB includes small electrode parts TD1 and TD2. The small electrode part TD1 of the touch detection electrode TDLB includes a plurality of wires 33g and a plurality of wires 33h extending in the second direction Dy. The wires 33g and the wires 33h are arranged in the first direction Dx being coupled to each other. The wires 33g and the wires 33h are made of the same material, i.e., any of the metallic materials described above.

In the wires 33g and the wires 33h arranged in the first direction Dx, a bending part of the wire 33g and a bending part of the wire 33h are coupled to each other to form the intersecting part TDX. The wires 33g and the wires 33h are conducted with each other at the intersecting parts TDX. As a result, the wire 33g and the wire 33h form a surrounded region mesh3 surrounded by a thin wire piece Ue and a thin wire piece Uf. The wire 33g and the wire 33h are not necessarily coupled to each other at the bending part. For example, the wire 33g and the wire 33h may be coupled to each other and conducted with each other at an intermediate part of the thin wire piece Ue in the wire 33g and an intermediate part of the thin wire piece Uf in the wire 33h. An extending direction of the wires 33g and 33h is a direction along a straight line connecting one end and the other end of one wire 33g or 33h. The extending direction of the wires 33g and 33h is the second direction Dy. The wires 33g and 33h each form a zigzag line or a wavy line. Each of the small electrode part TD2 and the small electrode parts TC1, TC2, and TC3 of the drive electrode COMLB has the same configuration as that of the small electrode part TD1.

As illustrated in FIG. 26, the small electrode part TD1 and the small electrode part TD2 are coupled to each other via the wires 33g and 33h at the position overlapping the bridge part 52. As illustrated in FIG. 27, the bridge part 52 is arranged above the touch detection electrode TDLB with a gap therebetween. Each of the small electrode part TC1 and the small electrode part TC2 of the drive electrode COMLB is coupled to the bridge part 52 via a connection electrode 52a in the through hole 38a. Accordingly, the small electrode part TC1 and the small electrode part TC2 are coupled to each other via the bridge part 52. The bridge part 52 can be made of a translucent conductive material such as ITO. The connection electrode 52a can be made of the same material as that of the bridge part 52 through the same process. The bridge part 52 and the connection electrode 52a may be made of the same metallic material as that of the wires 33g and 33h.

Adjacent small electrode part TC2 and small electrode part TD1 are electrically isolated from each other by a slit arranged in the wires 33g and 33h at positions indicated by dotted lines 51c and 51d in FIG. 26. Similarly, adjacent small electrode parts TC2 and TD2 are electrically isolated from each other by the slit arranged in the wires 33g and 33h. In this way, each small electrode part TC is isolated from each small electrode part TD, and capacitance is formed between the small electrode part TC of the drive electrode COMLB and the small electrode part TD of the touch detection electrode TDLB adjacent to the small electrode part TC.

As illustrated in FIG. 28, the conductive layer 36 is directly in contact with and overlaps the drive electrode COMLB and the touch detection electrode TDLB. The conductive layer 36 is arranged on the glass substrate 31, and the drive electrode COMLB and the touch detection electrode TDLB are arranged on the conductive layer 36. The conductive layer 36 is arranged across almost the entire surface of the glass substrate 31, and continuously arranged across the display region 10a and the frame region 10b illustrated in FIG. 25. In other words, the conductive layer 36 is in contact with and overlaps the wires 33g and 33h of the small electrode parts TC1 to TC3, TD1, and TD2 illustrated in FIG. 26.

With the configuration of the touch detection electrode TDLB according to the present embodiment, the conductive layer 36 is arranged being directly in contact with the wires 33g and 33h, so that even when static electricity is applied to the wires 33g and 33h from the outside, the static electricity on the wires 33g and 33h flows to the conductive layer 36. As a result, the static electricity on the wires 33g and 33h can be eliminated in a short period of time.

In the present embodiment, the drive electrode COMLB and the touch detection electrode TDLB are arranged on the same plane parallel with the glass substrate 31. Thus, as illustrated in FIG. 22, the common electrode 23 is arranged on the TFT substrate 21 in place of the drive electrode COML (refer to FIG. 9). The common electrode 23 is an electrode for giving a common potential to a plurality of pixel electrodes 22 of the display panel 20, and is continuously arranged on the TFT substrate 21.

The preferred embodiments of the present invention have been described above, but the present invention is not limited thereto. Content disclosed in the embodiments is merely an example, and various modifications can be made without departing from the gist of the invention. The present invention naturally encompasses an appropriate modification maintaining the gist of the invention.

For example, the shape, the line width, and the space width of the wires 33a to 33h can be appropriately modified. The wire 33e and wire 33f illustrated in FIG. 20 are symmetric about a symmetric axis that is a straight line parallel with the second direction Dy, and the wires 33g and the wire 33h illustrated in FIG. 26 are symmetric about a symmetric axis that is a straight line parallel with the second direction Dy. However, the embodiment is not limited thereto, and the wires may be asymmetrical.

In the third embodiment, as illustrated in FIG. 20, the dummy electrode TDD is arranged on the same plane as the touch detection electrode TDLA. The dummy electrode TDD may also be arranged in the display devices 1, 1A, and 1C with a touch detection function according to the first embodiment, the second embodiment, and the fourth embodiment. For example, the dummy electrode TDD may be arranged among adjacent wires 33a to 33d illustrated in FIG. 8, or the dummy electrode TDD may be arranged between adjacent touch detection electrodes TDL. The dummy electrode TDD may be arranged inside the surrounded region mesh3 surrounded by the thin wire piece Ue and the thin wire piece Uf illustrated in FIG. 26, or a part of the wires 33g and 33h constituting the small electrode part may be electrically disconnected to function as the dummy electrode TDD.

What is claimed is:

1. A touch detection device comprising: a substrate;
a conductive layer that is continuously formed on the substrate; and
a touch detection electrode including a plurality of wires arranged at intervals from one another on the conductive layer,
wherein
the wires are made of a metallic material,
the conductive layer is made of a translucent conductive material including oxide, and
a sheet resistance value of the wires is lower than a sheet resistance value of the conductive layer.

2. The touch detection device according to claim 1, wherein the sheet resistance value of the conductive layer is $10^9 \Omega/\square$ to $10^{13} \Omega/\square$.

3. The touch detection device according to claim 1, wherein the conductive layer includes
a first portion that is in direct contact with the wires and that overlaps the wires and
a second portion that does not overlap the wires in a display region for displaying an image.

4. The touch detection device according to claim 1, wherein the first portion of the conductive layer has a thickness larger than that of the second portion in a direction perpendicular to a surface of the substrate.

5. The touch detection device according to claim 1, wherein the conductive layer is arranged across an entire surface of a display region for displaying an image.

6. The touch detection device according to claim 1, wherein an area ratio of the wires with respect to an area of the conductive layer in a plan view is 10% or less in a display region for displaying an image.

7. The touch detection device according to claim 1, wherein the conductive layer includes a polycrystalline structure.

8. The touch detection device according to claim 7, wherein the wires are patterned by etching a metal layer, and
an etching rate of the conductive layer is lower than that of the metal layer with respect to an etchant for the metal layer.

9. The touch detection device according to claim 1, further comprising a dummy electrode arranged between the wires, the dummy electrode being separated from the wires and not functioning as the touch detection electrode.

10. The touch detection device according to claim 9, wherein each of the wires has a shape of a zigzag line or a wavy line, and the dummy electrode is arranged between the wires.

11. The touch detection device according to claim 1, wherein each of the wires includes
at least one first thin wire piece disposed at a first angle with respect to a first direction and
at least one second thin wire piece disposed at a second angle with respect to the first direction, the at least one first thin wire piece and the at least one second thin wire piece being coupled to each other.

12. A display device with a touch detection function, comprising:
a first substrate;
a conductive layer that is continuously formed on the first substrate;
a touch detection electrode including a plurality of wires arranged at intervals from one another on the conductive layer;
a second substrate facing the first substrate;
a plurality of pixel electrodes arranged in a matrix on the second substrate; and
a display function layer that have an image display function based on an image signal,
wherein
the wires are made of a metallic material,
the conductive layer is made of a translucent conductive material including oxide, and
a sheet resistance value of the wires is lower than a sheet resistance value of the conductive layer.

13. The display device with a touch detection function according to claim 12, further comprising a drive electrode that is arranged on a plane parallel with the substrate and forms capacitance between the drive electrode and the touch detection electrode, wherein
a touch detection operation of applying a drive signal to the drive electrode and detecting a touch input based on a touch detection signal supplied from the touch detection electrode, and a display operation of supplying a pixel signal to the pixel electrodes and causing the display function layer to exhibit the image display function are performed in a time division manner.

14. The display device with a touch detection function according to claim 12, wherein a touch detection operation of applying a drive signal to the touch detection electrode and detecting a touch input based on a touch detection signal supplied from the touch detection electrode, and a display operation of supplying a pixel signal to the pixel electrodes and causing the display function layer to exhibit the image display function are performed in a time division manner.

15. The display device with a touch detection function according to claim 12, wherein the conductive layer and the touch detection electrode are arranged so as to be directly in contact with each other.

16. The display device with a touch detection function according to claim 12, further comprising a polarizing plate arranged above the display function layer, wherein the substrate, the conductive layer, and the touch detection electrode are arranged between the display function layer and the polarizing plate.

* * * * *